United States Patent
Jung et al.

(10) Patent No.: US 9,824,667 B2
(45) Date of Patent: Nov. 21, 2017

(54) IMAGE PROCESSING APPARATUS AND METHOD

(71) Applicant: SAMSUNG ELECTRONICS CO., LTD., Suwon-si, Gyeonggi-do (KR)

(72) Inventors: Joo-young Jung, Seoul (KR); Tae-young Lee, Suwon-si (KR); Woo-ram Ann, Seongnam-si (KR); Jae-gil Lee, Seoul (KR); Cheul-hee Hahm, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 79 days.

(21) Appl. No.: 14/887,440

(22) Filed: Oct. 20, 2015

(65) Prior Publication Data

US 2016/0171957 A1 Jun. 16, 2016

(30) Foreign Application Priority Data

Dec. 12, 2014 (KR) .................. 10-2014-0179358

(51) Int. Cl.
  *G09G 5/36* (2006.01)
  *G09G 5/39* (2006.01)
  *G06T 1/60* (2006.01)

(52) U.S. Cl.
  CPC ............. *G09G 5/39* (2013.01); *G06T 1/60* (2013.01); *G09G 2360/18* (2013.01)

(58) Field of Classification Search
  CPC .... H04N 5/147; H04N 19/543; G06F 3/1462; G06F 17/30247; G09G 2310/04; G09G 2320/103; G09G 5/39; G09G 5/393; G09G 5/399
  See application file for complete search history.

(56) References Cited

U.S. PATENT DOCUMENTS

| 5,706,367 A | 1/1998 | Kondo |
| 6,561,907 B2 * | 5/2003 | Shimizu .................. A63F 13/10 463/31 |
| 8,965,140 B1 * | 2/2015 | Xu .......................... G06K 9/38 382/195 |

(Continued)

FOREIGN PATENT DOCUMENTS

| EP | 0 313 301 | 4/1989 |
| WO | 86/03922 | 7/1986 |

(Continued)

OTHER PUBLICATIONS

Extended Search Report mailed Mar. 15, 2016 in counterpart European Application No. 15195024.3.

*Primary Examiner* — Hau Nguyen
(74) *Attorney, Agent, or Firm* — Nixon & Vanderhye P.C.

(57) ABSTRACT

An image processing apparatus is provided including: a plurality of buffers, a first buffer from a among the plurality of buffers storing a first frame; and a controller configured to obtain frame information of a second frame, which includes second object information about a second object added in the second frame and second object location information indicating a second object area that is an area of the second object in the second frame, detect a duplicate area in the first frame, copy the duplicate area stored in the first buffer to a second buffer from among the plurality of buffers, and draw the second object in the second buffer based on the frame information.

16 Claims, 22 Drawing Sheets

(56) References Cited

U.S. PATENT DOCUMENTS

| | | |
|---|---|---|
| 2004/0042547 A1 | 3/2004 | Coleman |
| 2008/0094411 A1 | 4/2008 | Parenteau et al. |
| 2011/0199377 A1* | 8/2011 | Jang .................. G06T 15/20 345/426 |
| 2012/0127163 A1 | 5/2012 | Kim et al. |
| 2014/0063030 A1 | 3/2014 | Metcalfe |

FOREIGN PATENT DOCUMENTS

| | | |
|---|---|---|
| WO | 89/04101 | 5/1989 |
| WO | 92/01281 | 1/1992 |
| WO | 96/29680 | 9/1996 |

\* cited by examiner

| OBJECT LOCATION INFORMATION (TB1) ||
| --- | --- |
| FR-n |  OA1 |
| FR-n+1 |  OA2 |
| FR-n+2 |  OA3 |

IMAGE PROCESSING APPARATUS AND METHOD

CROSS-REFERENCE TO RELATED APPLICATION

This application is based on and claims priority under 35 U.S.C. §119 to Korean Patent Application No. 10-2014-0179358, filed on Dec. 12, 2014, in the Korean Intellectual Property Office, the disclosure of which is incorporated by reference herein in its entirety.

BACKGROUND

1. Field

The disclosure relates to image processing apparatuses and methods, and for example, to an image processing apparatus and method whereby a plurality of buffers are efficiently used.

2. Description of Related Art

The requirements for higher image resolution have gradually increased with the development of high-performance image processing apparatuses. However, with the increase in image resolution, the power consumption of an image processing apparatus may increase, animation performance may decrease, and memory usage may increase. Thus, an image processing apparatus and method having improved performance by efficiently using a plurality of buffers are required.

SUMMARY

Apparatuses and methods of processing an image by efficiently using a plurality of buffers are provided.

Additional aspects will be set forth in part in the detailed description which follows and, in part, will be apparent from the description.

According to an aspect of an example, an image processing apparatus includes: a plurality of buffers, a first buffer from a among the plurality of buffers storing a first frame; and a controller configured to obtain frame information of a second frame, which includes second object information about a second object added in the second frame and second object location information indicating a second object area of the second object in the second frame, to detect a duplicate area in the first frame, to copy the duplicate area stored in the first buffer to a second buffer from among the plurality of buffers, and to draw the second object in the second buffer based on the frame information.

The controller may be further configured to obtain a first object area of the first frame, to compare the first object area with the second object area, and to detect the first object area excluding the second object area as the duplicate area.

The image processing apparatus may further include a storage unit configured to store first object location information indicating the first object area of the first frame, wherein the controller may be further configured to obtain the first object area based on the first object location information stored in the storage unit and to update the second object location information of the second frame in the storage unit.

The frame information of the second frame may further include alpha data for alpha blending.

The controller may be further configured to obtain a first object area of the first frame and to detect the first object area as the duplicate area.

The controller may be further configured to draw, in the second buffer, the second object being merged in the first frame based on the alpha data.

When the frame information of the second frame includes alpha data, the controller may be further configured to detect a first object area of the first frame as the duplicate area, and when the frame information of the second frame does not include alpha data, the controller is further configured to detect the first object area excluding the second object area as the duplicate area.

The image processing apparatus may further include a display configured to output the first frame, and when the controller draws the second object in the second buffer, the display may be further configured to output the second frame immediately following the first frame.

The image processing apparatus may further include an input configured to receive a manipulation command, wherein the controller may be further configured to obtain the frame information of the second frame based on the manipulation command.

The controller may be further configured to detect a different area between initial data stored in the second buffer and the first frame and to detect the different area or a part of the different area as the duplicate area.

According to an aspect of another example, a method of operating an image processing apparatus includes: obtaining frame information of a second frame, which includes second object information about a second object added in a second frame immediately following a first frame and second object location information indicating a second object area that is an area of the second object in the second frame; detecting a duplicate area from the first frame; copying the duplicate area of a first buffer in which the first frame is stored to a second buffer; and drawing the second object in the second buffer based on the frame information.

Detecting the duplicate area may include: obtaining a first object area of the first frame; comparing the first object area with the second object area; and detecting the first object area excluding the second object area as the duplicate area.

The first object area may be obtained based on first object area information indicating the first object area, the first object area information being stored in a storage unit, and the method may further include updating the second object location information of the second frame in the storage unit.

The frame information of the second frame may further include alpha data for alpha blending.

Detecting the duplicate area may include: obtaining a first object area of the first frame; and detecting the first object area as the duplicate area.

Drawing the second object may include drawing the second object in the second buffer such that the second object is merged in the first frame based on the alpha data.

When the frame information of the second frame includes alpha data, a first object area of the first frame may be detected as the duplicate area, and when the frame information of the second frame does not include alpha data, the first object area excluding the second object area may be detected as the duplicate area.

The method may further include: outputting the first frame; and outputting the second frame immediately following the first frame, when the second object is drawn in the second buffer.

The method may further include receiving a manipulation command, wherein the frame information of the second frame may be obtained based on the manipulation command.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein.

DETAILED DESCRIPTION

Figure 1:
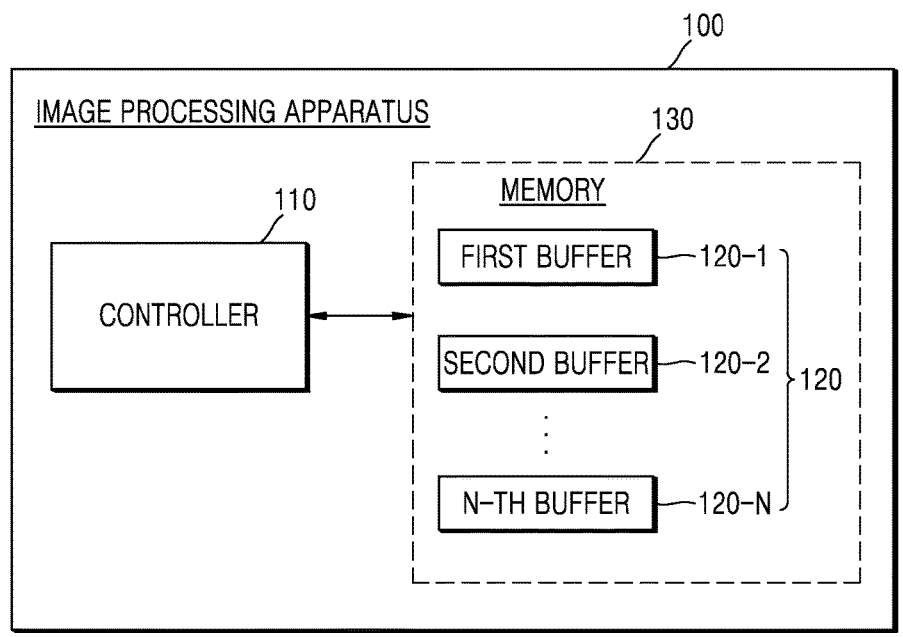
FIG. 1 is a block diagram illustrating an example image processing apparatus.

Advantages and features of one or more examples of the disclosure and methods of accomplishing the same may be understood more readily by reference to the following detailed description and the accompanying drawings. In this regard, the examples may have different forms and should not be construed as being limited to the descriptions set forth herein. Rather, these examples are provided so that this disclosure will be thorough and complete and will convey the concept of the examples to one of ordinary skill in the art, and the disclosure will be defined by the appended claims. Like reference numerals refer to like elements throughout the specification.

All terms including descriptive or technical terms which are used herein should be construed as having meanings that are apparent to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the disclosure.

Expressions such as "at least one of," when preceding a list of elements, modify the entire list of elements and may not modify the individual elements of the list.

FIG. 1 is a block diagram illustrating an example image processing apparatus 100.

Referring to FIG. 1, the image processing apparatus 100 may include a controller 110 and a memory 130 that may include a plurality of buffers 120, e.g., first through N-th buffers 120-1 through 120-N.

The image processing apparatus 100 may be included in a display apparatus or connected to the display apparatus. The display apparatus may, for example, be an electronic device for displaying an image. For example, the display apparatus may be any one of various electronic devices, for example, a television (TV) apparatus or a smart device such as a smart phone and a tablet personal computer (PC).

The controller 110 may be configured to control overall operations of the image processing apparatus 100 and may be configured to process various types of data required for operations of the image processing apparatus 100. The controller 110 may, for example, include a central processing unit (CPU), a microprocessor, an/or a graphic processing unit (GPU).

The controller 110 may be configured to obtain frame information that is information about a frame. The controller 110 may be configured to obtain the frame information via any one of various methods, for example, the controller 110 may be configured to receive the frame information from an external device, to obtain the frame information based on an input (e.g., a user input), or may be configured to obtain the frame information based on data stored in the memory 130. The controller 110 may be configured to assign the frame to one of the plurality of buffers 120, and to store the frame in the assigned buffer. The controller 110 may be configured to control the image processing apparatus 100 such that the frame stored in the assigned buffer is output on a screen of the display apparatus.

The frame may be 2-dimensional (2D) digital data including pixel values of pixels that are discrete elements. The pixel value may include at least one of luminance information and color information.

While the frame stored in one of the plurality of buffers 120 of the image processing apparatus 100 is displayed on the screen of the display apparatus as a current frame, the image processing apparatus 100 may perform an operation of storing a next frame after the current frame in another one of the plurality of buffers 120. Accordingly, two consecutive frames may be stored in different buffers.

A point of time when a frame is changed to a next frame may be pre-determined. Alternatively, when frames are related to a user interface (UI), a frame providing a UI may be output, and then the frame may be changed to a next frame after receiving a certain input, for example, from a user. At this time, the next frame may be configured based on an input.

In the disclosure, first and second frames are two consecutive frames, wherein the second frame is a next frame of the first frame.

The first buffer 120-1 may, for example, store the first frame. The controller 110 may be configured to obtain frame information of the second frame. Accordingly, the second frame that is the next frame of the first frame may start. The frame information of the second frame may include second object information about a second object added in the second frame, and second object location information indicating a second object area that is an area of the second object in the second frame. The second object information is information required to draw the second object in the second object area. The second object information may include pixel values of pixels included in the second object area. Alternatively, the second object information may include information required to obtain the pixel values.

Two consecutive frames are often mostly the same. For example, a new frame is often only partially different from a previous frame, specifically when frames are related to a UI. Accordingly, the frame information of the second frame that is the next frame of the first frame may include the second object information and the second object location information, which are required to draw the second object that is an area of the second frame, which is different from the first frame.

The controller 110 may be configured to detect a duplicate area that is a part of the first frame from the first buffer 120-1, in which the first frame that is a previous frame is stored, and copy only the duplicate area to the second buffer 120-2 to which the second frame is assigned. The controller 110 may be configured to detect a different area between initial data stored in the second buffer 120-2 and the first frame, and to detect the different area or a part of the different area as the duplicate area. The initial data stored in the second buffer 120-2 is data of the second buffer 120-2 before the controller 110 stores the duplicate area in the second buffer 120-2. When the image processing apparatus 100 assigns a frame only to the first and second buffers 120-1 and 120-2, the initial data of the second buffer 120-2 may be a previous frame of the first frame, which is continuous from the first frame. When the image processing apparatus 100 assigns a frame to at least three buffers from among the plurality of buffers 120, the initial data of the second buffer 120-2 may be a previous frame before the first frame, e.g., a previous frame that is not right before the first frame. For example, the previous frame may one of two frames before the first frame. Alternatively, the second buffer 120-2 may not store the initial data. For example, no data may be initially stored in the second buffer 120-2.

When an m-th frame that is one of previous frames of the first frame is stored in the second buffer 120-2 as the initial data, the image processing apparatus 100 may detect an area that is different between the m-th frame and the first frame as the different area. For example, the different area may be detected by comparing cyclic redundancy check (CRC) of the m-th frame with CRC of the first frame, but a method of detecting the different area is not limited thereto.

The controller 110 may be configured to draw the second object in the second buffer 120-2 based on the frame information of the second frame. The controller 110 drawing the second object in the second buffer 120-2 may include writing the pixel values of the pixels included in the second object area in the second buffer 120-2. When the controller 110 draws the second object in the second buffer 120-2, the second frame is stored in the second buffer 120-2.

As such, according to an example, by copying the duplicate area from the first buffer 120-1 to the second buffer 120-2, the first frame or a part of the first frame may be stored in the second buffer 120-2. Then, the second object of the second frame is drawn in the second buffer 120-2. Accordingly, the image processing apparatus 100 may obtain the second frame by adding the second object that is the area of the second frame, which is different from the first frame, to the first frame that is the previous frame or to the part of the first frame. The image processing apparatus 100 according to an example does not obtain all areas of a new frame again whenever a frame is changed, but may use a partial updating method of reusing a previous frame. Accordingly, a processing speed of the image processing apparatus 100 may be increased, and processing overhead of image processing may be decreased.

Figure 2:
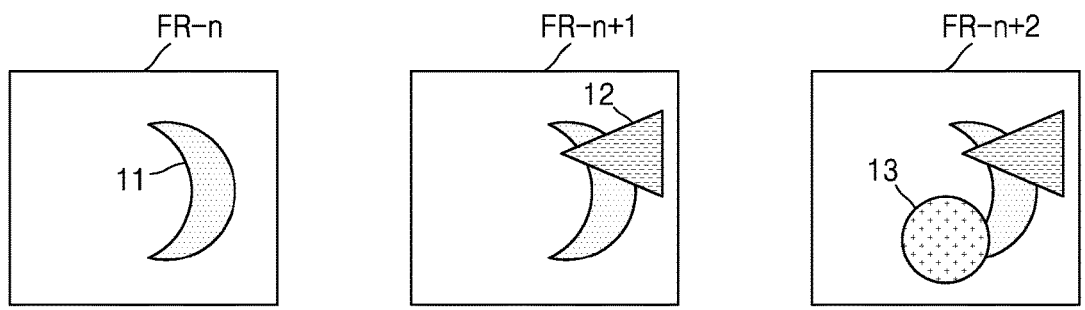
FIG. 2 illustrates an example of three consecutive frames.

FIG. 2 illustrates an example of three consecutive frames, e.g., n-th through n+2-th frames FR-n through FR-n+2.

Referring to FIG. 2, the n-th through n+2-th frames FR-n through FR-n+2 may be sequentially output on a screen of a display apparatus.

The display apparatus may output the n-th frame FR-n. A first object 11 having a moon shape is displayed on a screen of the display apparatus.

The display apparatus may output the n+1-th frame FR-n+1. A second object 12 having a triangle shape, which is added to the n-th frame FR-n, is displayed on the screen of the display apparatus.

The display apparatus may output the n+2-th frame FR-n+2. A third object 13 having a circular shape, which is added to the n+1th frame FR-n+1, is displayed on the screen of the display apparatus.

As shown in the n-th and n+1-th frames FR-n and FR-n+1, or the n+1-th and n+2-th frames FR-n+1 and FR-n+2 of FIG. 2, consecutive frames are mostly the same and only a part of a next frame is different from a previous frame.

A method of sequentially storing, by the image processing apparatus 100, the n-th through n+2-th frames FR-n through FR-n+2 of FIG. 2, according to an example will now be described. For convenience of description, it is assumed that the image processing apparatus 100 uses only two buffers, i.e., the first and second buffers 120-1 and 120-2. Also, it is assumed that both the first and second buffers 120-1 and 120-2 do not initially store any data. For example, initial data of the first and second buffers 120-1 and 120-2 is NULL. However, it will be understood that the disclosure is not so limited.

Referring back to FIGS. 1 and 2, the controller 110 of the image processing apparatus 100 may be configured to obtain frame information of the n-th frame FR-n. The frame information of the n-th frame FR-n may include first object information about the first object 11 added in the n-th frame FR-n, and first object location information indicating a first object area that is an area of the first object 11 in the n-th frame FR-n. When the n-th frame FR-n is completely different from a previous frame or when a previous frame does not exist, the first object area may be an entire area of the n-th frame FR-n. When only a part of the n-th frame FR-n is different from the previous frame, the first object area may be a partial area of the n-th frame FR-n.

Figure 3:
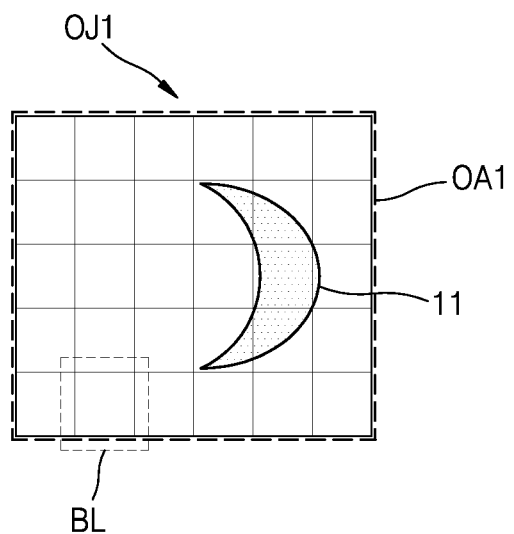
FIG. 3 is a diagram illustrating example frame information of an n-th frame obtained by a controller of FIG. 1.

FIG. 3 is a diagram illustrating example frame information OJ1 of the n-th frame FR-n obtained by the controller 110 of FIG. 1.

Referring to FIGS. 1 through 3, the frame information OJ1 of the n-th frame FR-n may include first object location information indicating a location of a first object area OA1 that is an area of the first object 11 added in the n-th frame FR-n, and first object information required to draw the first object 11. A basic unit of the first object area OA1 may be a block (BL block). The block BL may be one pixel or a group of pixels. For example, the first object location information may be information indicating a location or coordinate of a block corresponding to the first object area OA1 in the n-th frame FR-n.

In FIG. 3, the first object area OA1 is an entire area of the n-th frame FR-n. When the n-th frame FR-n is completely different from a previous frame or a previous frame does not exist, the first object area OA1 may be an entire area of the n-th frame FR-n. When the n-th frame FR-n is only partially different from the previous frame, the first object area OA1 may be a partial area of the n-th frame FR-n.

The controller 110 of FIG. 1 may be configured to assign the n-th frame FR-n to the first buffer 120-1. The controller 110 may be configured to draw the first object 11 in the first buffer 120-1 based on the frame information OJ1 of the n-th frame FR-n.

Figure 4:
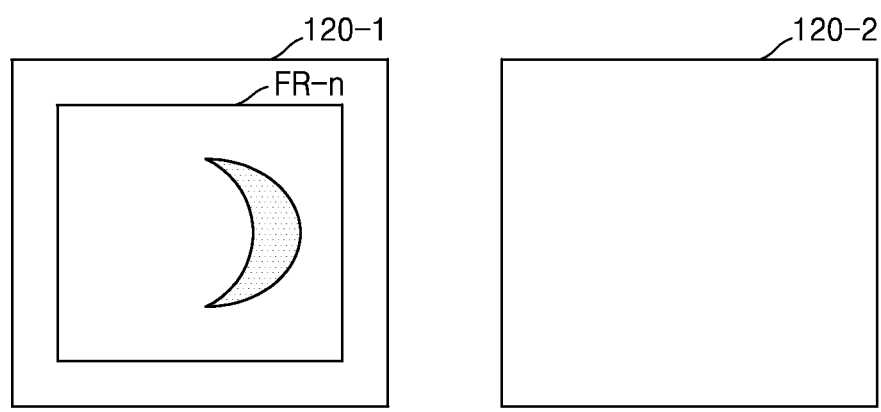
FIG. 4 illustrates a first buffer and a second buffer.

FIG. 4 illustrates an example first buffer 120-1 and the second buffer 120-2. When the controller 110 of FIG. 1 finishes drawing of the first object 11 of FIG. 3 in the first buffer 120-1, the n-th frame FR-n is stored in the first buffer 120-1 as shown in FIG. 4. No data is stored in the second buffer 120-2. The display apparatus may output the n-th frame FR-n stored in the first buffer 120-1.

The image processing apparatus 100 of FIG. 1 may obtain frame information of the n+1-th frame FR-n+1. When the image processing apparatus 100 obtains the frame information of the n+1-th frame FR-n+1, the image processing apparatus 100 may perform an operation for outputting the n+1-th frame FR-n+1 that is the next frame of the n-th frame FR-n.

Figure 5:
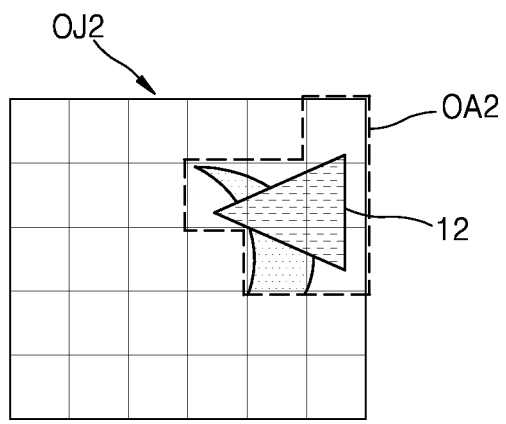
FIG. 5 is a diagram illustrating example frame information of an n+1-th frame obtained by the controller of FIG. 1.

FIG. 5 is a diagram illustrating example frame information OJ2 of the n+1-th frame FR-n+1 obtained by the controller of FIG. 1.

Referring to FIGS. 1 and 5, the frame information OJ2 of the n+1-th frame FR-n+1 may include second object location information indicating a location of a second object area OA2 that is an area of the second object 12 added in the n+1-th frame FR-n+1, and second object information required to draw the second object 12. For example, the frame information OJ2 of the n+1-th frame FR-n+1 may include information about an area updated from the n-th frame FR-n that is a previous frame. An updated area may denote an area added to, deleted from, or changed from the n-th frame FR-n.

Since the n-th frame FR-n is stored in the first buffer 120-1, the controller 110 may be configured to assign the n+1-th frame FR-n+1 to the second buffer 120-2. The controller 110 may be configured to detect a duplicate area from the n-th frame FR-n, and to copy the duplicate area stored in the first buffer 120-1 to the second buffer 120-2. A different area between initial data (NULL) stored in the second buffer 120-2 and the n-th frame FR-n is the same as the first object area OA1. The controller 110 may be configured to detect the different area or a part of the different area as the duplicate area.

Figure 6:
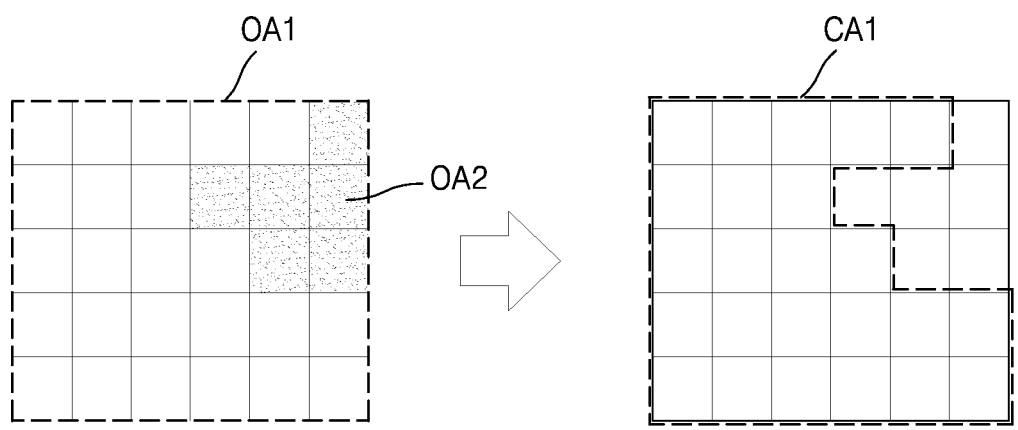
FIG. 6 is a diagram illustrating an example method of detecting a duplicate area by the controller of FIG. 1.

FIG. 6 is a diagram illustrating an example method of detecting a duplicate area by the controller 110 of FIG. 1.

Referring to FIGS. 1 and 6, the controller 110 may be configured to compare the first object area OA1, which is an object area of the n-th frame FR-n (see FIG. 3), with the second object area OA2, which is an object area of the n+1-th frame FR-n+1 (see FIG. 5), in order to detect an area obtained by excluding the second object area OA2 from the first object area OA1 as the duplicate area CA1. For example, the controller 110 may be configured to detect as the duplicate area CA the first object area OA1 excluding an overlapping area between the first and second object areas OA1 and OA2.

The controller 110 may obtain the first object area OA1 based on the frame information OJ1 of FIG. 3 of the n-th frame FR-n. Also, the controller 110 may obtain the second object area OA2 based on the frame information OJ2 of FIG. 5 of the n+1-th frame FR-n+1.

Figure 7:
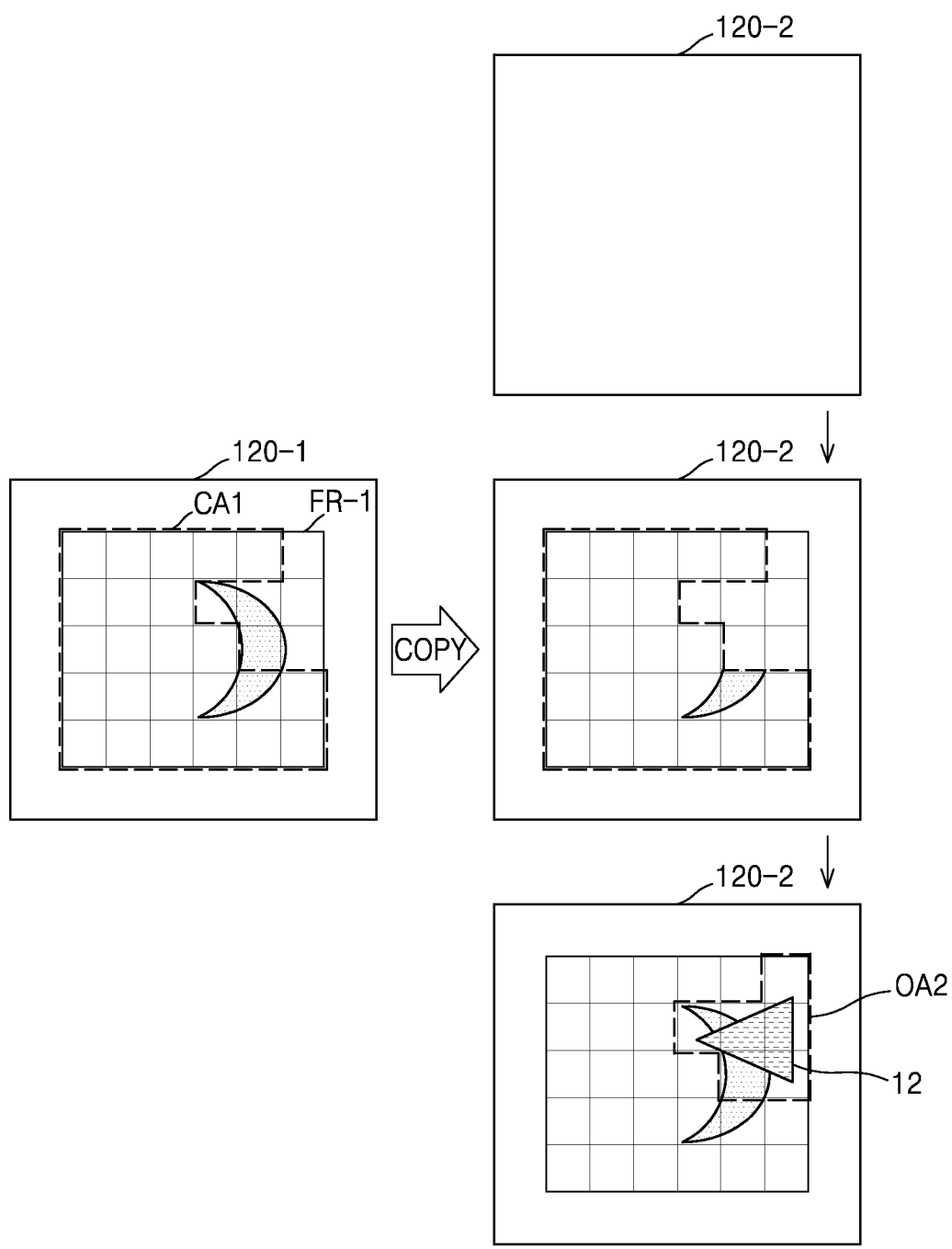
FIG. 7 is a diagram illustrating an example method of storing the n+1-th frame in the second buffer.

FIG. 7 is a diagram illustrating an example method of storing the n+1-th frame FR-n+1 in the second buffer 120-1.

Referring to FIGS. 1 and 7, the first and second buffers 120-1 and 120-2 are as shown in FIG. 4. For example, the n-th frame FR-n is stored in the first buffer 120-1, and no data is stored in the second buffer 120-2.

The controller 110 may be configured to detect the duplicate area CA1 from the n-th frame FR-n and copy the duplicate area CA1 stored in the first buffer 120-1 to the second buffer 120-2. As shown in FIG. 6, the controller 110 may be configured to detect the duplicate area CA1 from the n-th frame FR-n. Copying between the first and second buffers 120-1 and 120-2 may include processes performed by the controller 110 to read data stored in the duplicate area CA1 of the first buffer 120-1 and write the read data to an area of the second buffer 120-2 which corresponds to the duplicate area CA1.

The controller 110 may be configured to set the second object area OA2 in the second buffer 120-2 based on the frame information OJ2 of FIG. 5 of the n+1-th frame FR-n+1, and draw the second object 12 in the second object area OA2. Drawing of the second object 12 in the second buffer 120-2 may mean writing the pixel values of the pixels included in the second object area OA2 on the second buffer 120-2.

Figure 8:
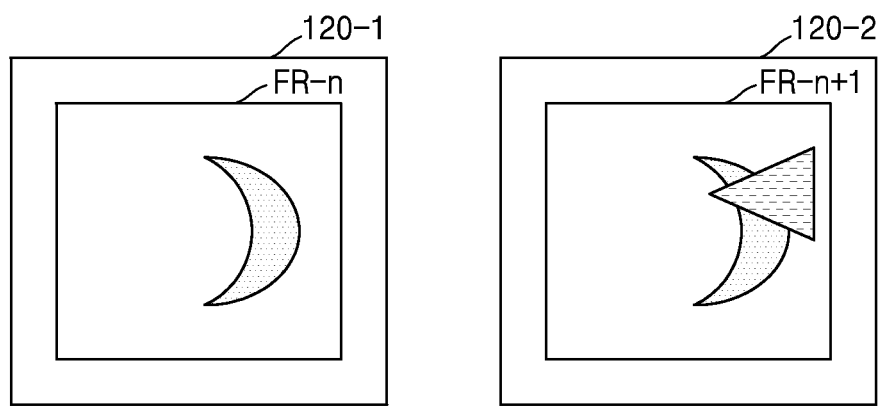
FIG. 8 illustrates the first buffer and the second buffer after operations of FIG. 7 are completed.

FIG. 8 illustrates the first buffer 120-1 and the second buffer 120-2 after operations of FIG. 7 are completed.

Referring to FIGS. 1 and 8, the n-th frame FR-n is stored in the first buffer 120-1 and the n+1-th frame FR-n+1 is stored in the second buffer 120-2. The display apparatus including the image processing apparatus 100 or connected to the image processing apparatus 100 may output the n+1-th frame FR-n+1 stored in the second buffer 120-2. Accordingly, the screen of the display apparatus may be changed from the n-th frame FR-n to the n+1-th frame FR-n+1.

The image processing apparatus 100 of FIG. 1 may obtain frame information of the n+2-th frame FR-n+2.

Figure 9:
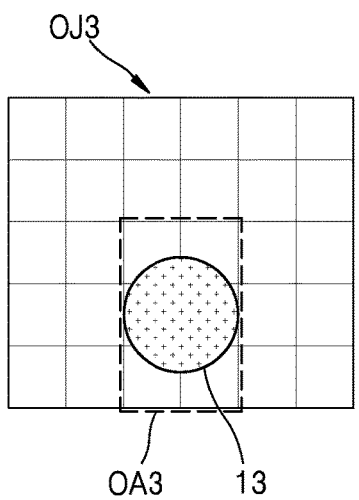
FIG. 9 is a diagram illustrating example frame information of an n+2-th frame obtained by the controller of FIG. 1.

FIG. 9 is a diagram illustrating frame information OJ3 of the n+2-th frame FR-n+2 obtained by the controller 110 of FIG. 1.

Referring to FIGS. 1 and 9, the frame information OJ3 of the n+2-th frame FR-n+2 may include third object location information indicating a location of a third object area OA3 that is an area of the third object 13 added in the n+2-th frame FR-n+2, and third object information required to draw the third object 13.

As shown in FIG. 8, since the n+1-th frame FR-n+1 is stored in the second buffer 120-2, the controller 110 may be configured to assign the n+2-th frame FR-n+2 to the first buffer 120-1. The controller 110 may be configured to detect a duplicate area from the n−1-th frame FR-n+1 that is a previous frame, and copy the duplicate area stored in the second buffer 120-2 to the first buffer 120-1. When the image processing apparatus 100 uses only the first and second buffers 120-1 and 120-2, initial data of the first buffer 120-1 is the n-th frame FR-n. Accordingly, a different area between the initial data [the n-th frame FR-n] of the first buffer 120-1 and the n+1-th frame FR-n+1 is the same as the second object area OA2. The controller 110 may be configured to detect the different area or a part of the different area as the duplicate area.

Figure 10:
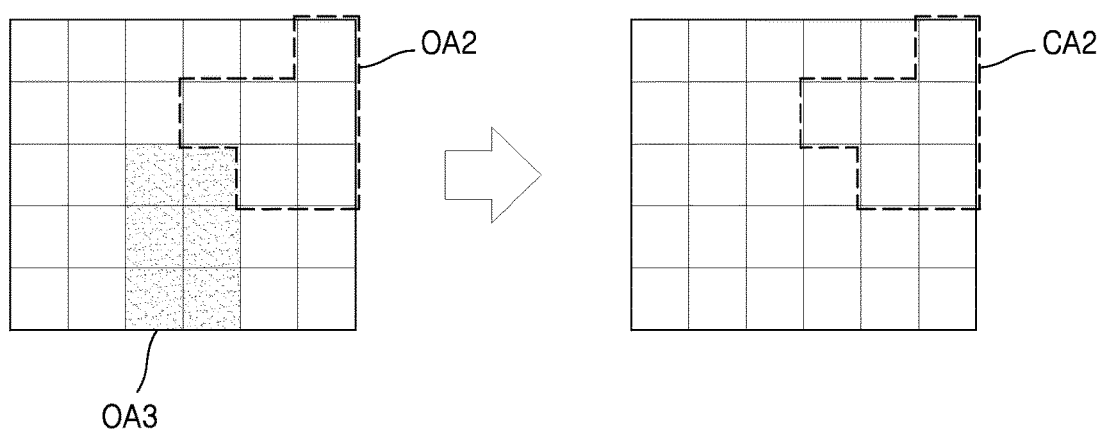
FIG. 10 is a diagram illustrating an example method of detecting a duplicate area by the controller of FIG. 1.

FIG. 10 is a diagram illustrating an example method of detecting a duplicate area, by the controller 110 of FIG. 1.

Referring to FIGS. 1 and 10, the controller 110 may be configured to compare the second object area OA2, which is an object area of the n+1-th frame FR-n+1 (see FIG. 5), with the third object area OA3, which is an object area of the n+2-th frame FR-n+2 (see FIG. 9), in order to detect an area obtained by excluding the third object area OA3 from the second object area OA2 as the duplicate area CA2. In FIG. 10, since there is no overlapping area between the second and third object areas OA2 and OA3, the duplicate area CA2 is the same as the second object area OA2.

Figure 11:
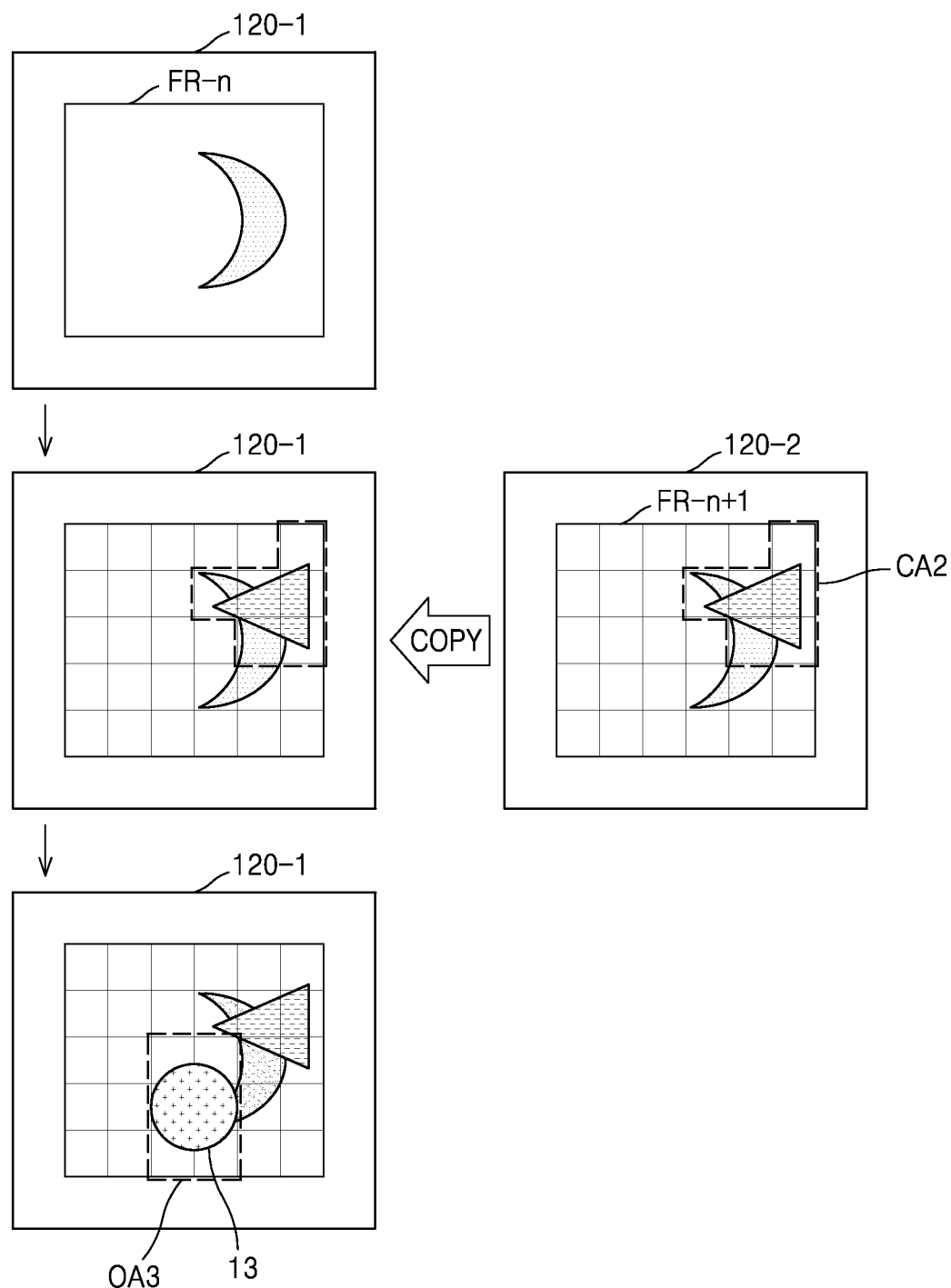
FIG. 11 is a diagram illustrating an example method of storing the n+1-th frame in the first buffer.

FIG. 11 is a diagram illustrating an example method of storing the n+1-th frame FR-n+1 in the first buffer 120-1.

Referring to FIGS. 1 and 11, the first and second buffers 120-1 and 120-2 are initially as shown in FIG. 8. For example, the n-th frame FR-n is stored in the first buffer 120-1 and the n+1-th frame FR-n+1 is stored in the second buffer 120-2.

The controller 110 may be configured to detect the duplicate area CA2 from the n+1-th frame FR-n+1, and copy the duplicate area CA2 stored in the second buffer 120-2 to the first buffer 120-1.

Then, the controller 110 may be configured to set the third object area OA3 in the first buffer 120-1 based on the frame information OJ3 of FIG. 9 of the n+2-th frame FR-n+2, and to draw the third object 13 in the third object area OA3.

Figure 12:
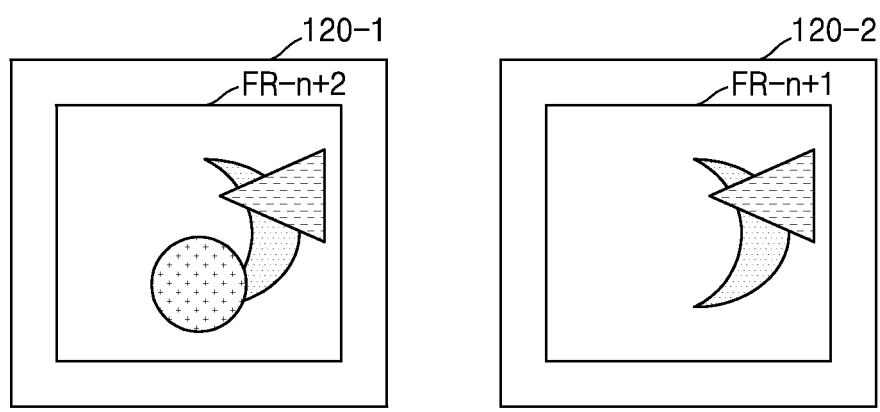
FIG. 12 illustrates the first buffer and the second buffer after operations of FIG. 11 are completed.

FIG. 12 illustrates the first buffer 120-1 and the second buffer 120-2 after operations of FIG. 11 are completed.

Referring to FIGS. 1 and 12, the n+2-th frame FR-n+2 is stored in the first buffer 120-1 and the n+1-th frame FR-n+1 is stored in the first buffer 120-1. The display apparatus including the image processing apparatus 100 or connected to the image processing apparatus 100 may output the n+2-th frame FR-n+2 stored in the first buffer 120-1. Accordingly, the screen of the display apparatus may be changed from the n+1-th frame FR-n+1 to the n+2-th frame FR-n+2.

A case in which the first and second buffers 120-1 and 120-2 are as shown in FIG. 8 and frame information of the n+2-th frame FR-n+2, which is the next frame after the n+1-th frame FR-n+1, is different from the frame information OJ3 of FIG. 9 will be described with reference to FIGS. 13 through 16.

Figure 13:
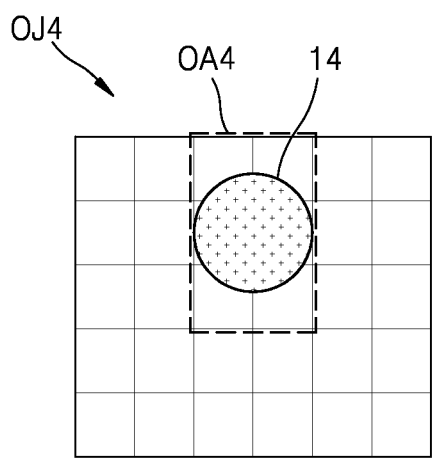
FIG. 13 is a diagram illustrating example frame information of the n+2-th frame obtained by the controller of FIG. 1.

FIG. 13 is a diagram illustrating frame information OJ4 of the n+2-th frame FR-n+2 obtained by the controller 110 of FIG. 1. The frame information OJ4 is different from the frame information OJ3 of FIG. 9.

Referring to FIGS. 1 and 13, the frame information OJ4 of the n+2-th frame FR-n+2 may include object location information indicating a location of an object area OA4 that is an area of an object 14 added in the n+2-th frame FR-n+2, and object information required to draw the object 14.

Figure 14:
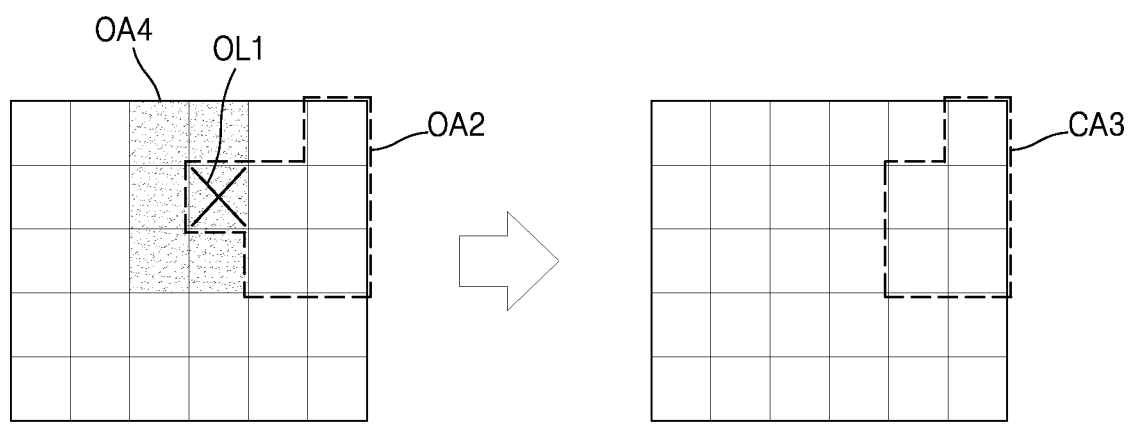
FIG. 14 is a diagram illustrating an example method of detecting a duplicate area by the controller of FIG. 1.

FIG. 14 is a diagram illustrating an example method of detecting a duplicate area by the controller 110 of FIG. 1.

Referring to FIGS. 1 and 14, the controller 110 may be configured to compare the second object area OA2, which is an object area of the n+1-th frame FR-n+1 (see FIG. 5), with the object area OA4, which is an object area of the n+2-th frame FR-n+2, in order to detect an area obtained by excluding the object area OA4 from the second object area OA2 as the duplicate area CA3. In FIG. 14, a part of the second object area OA2, wherein an overlapping area OL1 between the second object area OA2 and the object area OA4 is excluded, may be detected as the duplicate area CA3.

Figure 15:
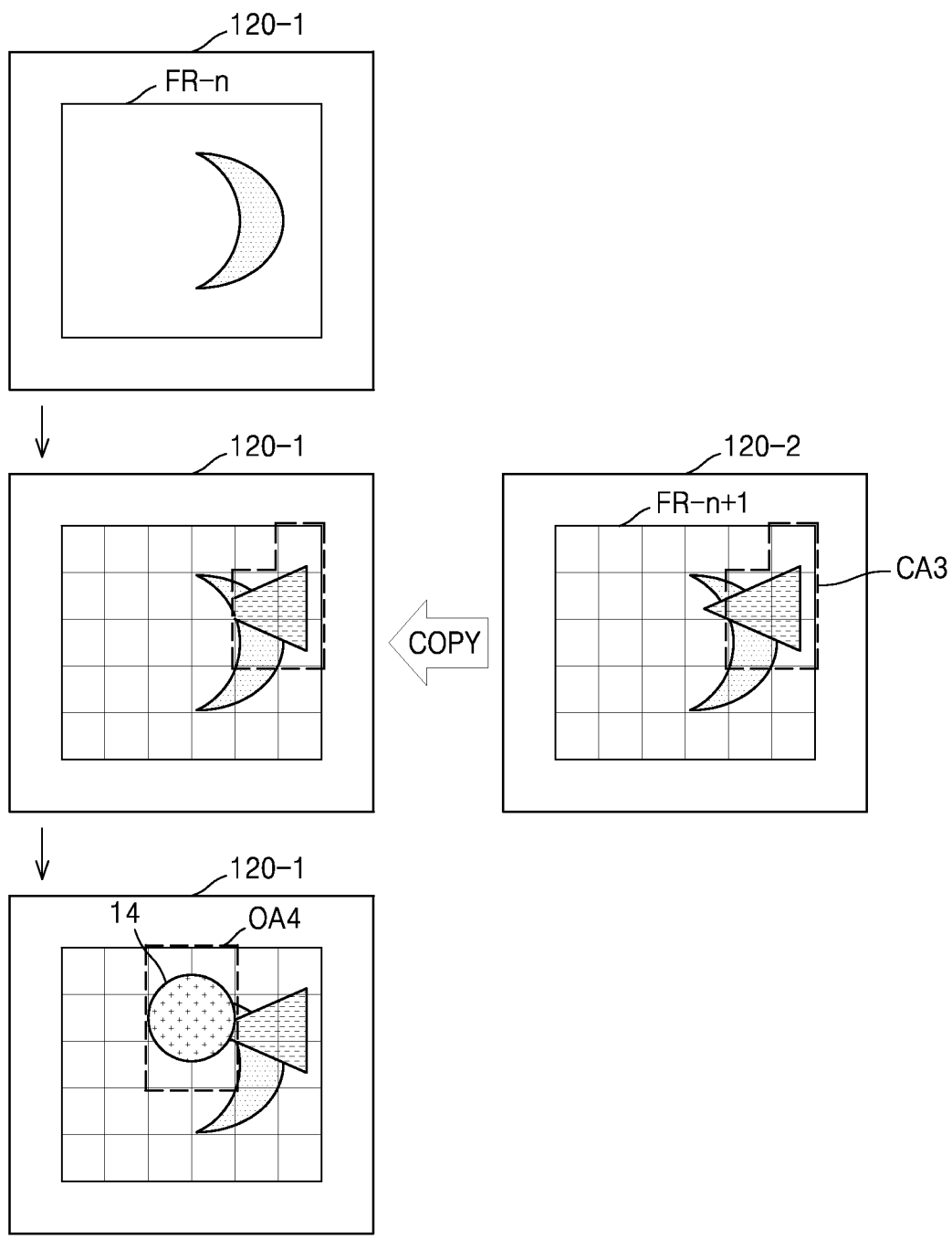
FIG. 15 is a diagram illustrating an example method of storing the n+2-th frame in the first buffer.

FIG. 15 is a diagram illustrating an example method of storing the n+2-th frame FR-n+2 in the first buffer 120-1.

Referring to FIGS. 1 and 15, the first and second buffers 120-1 and 120-2 are initially as shown in FIG. 8. For example, the n-th frame FR-n is stored in the first buffer 120-1 and the n+1-th frame FR-n+1 is stored in the second buffer 120-2.

The controller 110 may be configured to detect the duplicate area CA3 from the n+1-th frame FR-n+1, and copy the duplicate area CA3 stored in the second buffer 120-2 to the first buffer 120-1.

The controller 110 may be configured to set the object area OA4 in the first buffer 120-1 based on the frame information OJ4 of the n+2-th frame FR-n+2 of FIG. 13, and draw the object 14 in the object area OA4.

Figure 16:
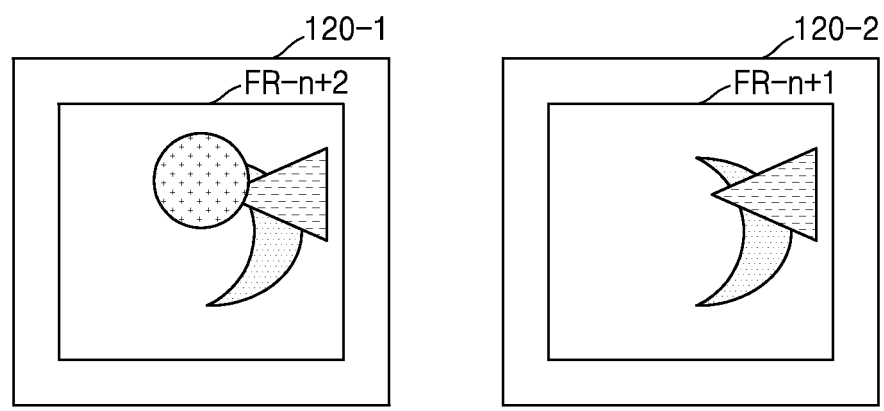
FIG. 16 illustrates the first buffer and the second buffer after operations of FIG. 15 are completed.

FIG. 16 illustrates the first buffer 120-1 and the second buffer 120-2 after operations of FIG. 15 are completed.

Referring to FIGS. 1 and 16, the n+2-th frame FR-n+2 is stored in the first buffer 120-1 and the n+1-th frame FR-n+1 is stored in the second buffer 120-2.

Figure 17:
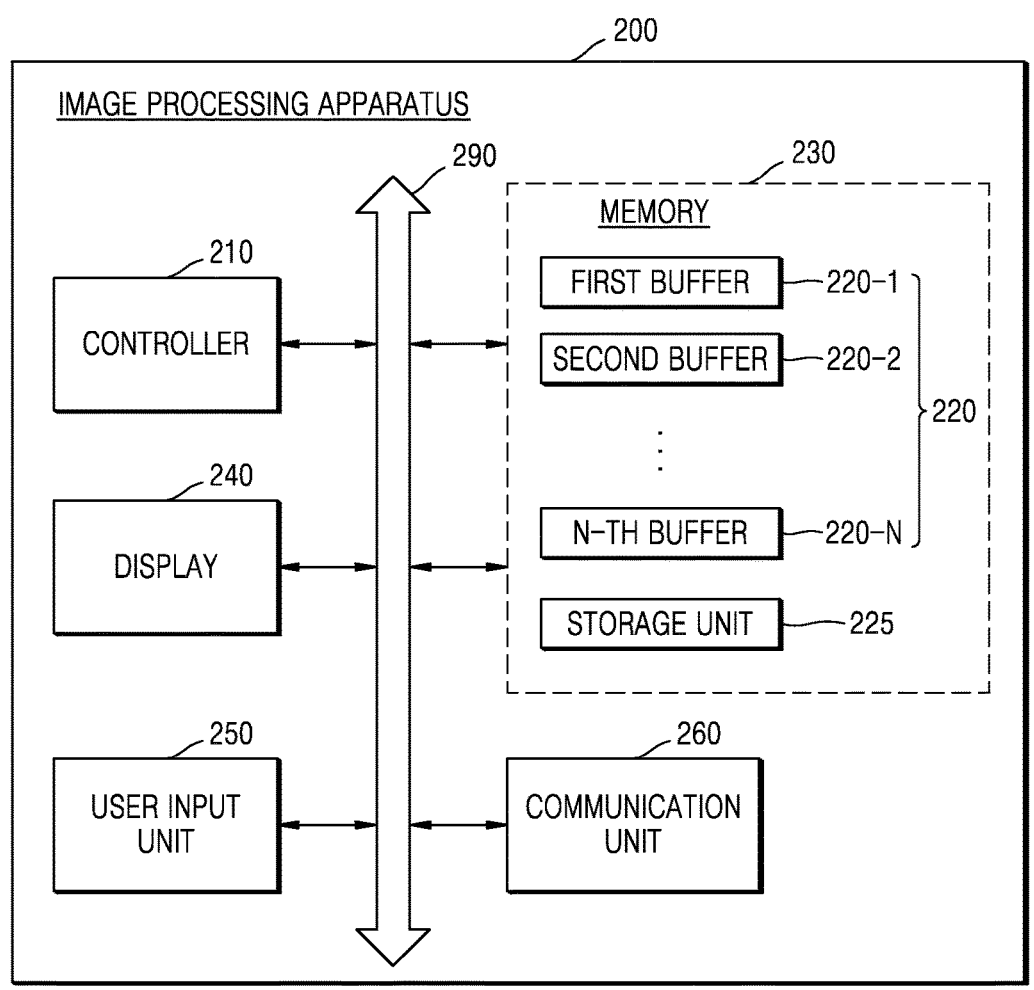
FIG. 17 is a block diagram illustrating an example image processing apparatus.

FIG. 17 is a block diagram illustrating another example image processing apparatus 200.

Referring to FIG. 17, the image processing apparatus 200 includes a controller 210, and a memory 230 including a plurality of buffers 220. Since details described above are applied to the controller 210 and the plurality of buffers 220, overlapping descriptions thereof are not provided again. The image processing apparatus 200 may further include a display 240 and a user input unit 250. Also, the image processing apparatus 200 may further include a communication unit 260 in the form of communication circuitry. Several components of the image processing apparatus 200 may be connected to each other through a bus 290.

The display 240 may output on a screen a frame stored in each of the plurality of buffers 220. Examples of the display 240 may, for example, include a cathode ray tube (CRT) display, a liquid crystal display (LCD), a plasma display panel (PDP), an organic light-emitting diode (OLED) display, a field emission display (FED), a light-emitting diode (LED) display, a vacuum fluorescence display (VFD), a digital light processing (DLP) display, a flat panel display (FPD), a 3-dimensional (3D) display, a transparent display, or the like. Further examples of the display 240 may include various display apparatuses within a range apparent to one of ordinary skill in the art.

The user input unit 250 may, for example, receive, a command for manipulating the image processing apparatus 200. Examples of the user input unit 250 may include a keyboard, a mouse, a touch screen, a voice recognizer, a fingerprint recognizer, an iris recognizer, or the like, and may further include various input apparatuses apparent to one of ordinary skill in the art.

The display 240 and the user input unit 250 may provide a UI for manipulating the image processing apparatus 200. For example, the display 240 may provide a UI by outputting the n-th frame FR-n of FIG. 4. The user input unit 250 may receive a manipulation command for manipulating the image processing apparatus 200. The controller 210 may be configured to obtain the frame information OJ1 of the n+1-th frame FR-n+1 as shown in FIG. 5 based on the manipulation command. The controller 210 may be configured to store the n+1-th frame FR-n+1 in one of the plurality of buffers 220 via operations described above with reference to FIGS. 6 and 7. When the n+1-th frame FR-n+1 is stored in the second buffer 120-2 as shown in FIG. 8, the controller 210 may be configured to control the display 240 to output the n+1-th frame FR-n+1.

The communication unit 260 is configured such that the image processing apparatus 200 communicates with an external device. The image processing apparatus 200 may receive, from the external device, frame information (see FIGS. 3, 5, and 9) through the communication unit 260. The communication unit 260 may include at least one component or circuitry that enables the image processing apparatus 200 to communicate with the external device. For example, the communication unit 260 may include a local area communication module, a wired communication module, or a mobile communication module.

The local area communication module may, for example, be a module for performing a local area communication with an apparatus within a certain distance. Examples of a local area communication technology may include wireless local area network (LAN), Wi-Fi, Bluetooth, ZigBee, Wi-Fi direct (WFD), ultra wideband (UWB), infrared data association (IrDA), Bluetooth low energy (BLE), and near field communication (NFC), but are not limited thereto.

The wired communication module may, for example, be a module for communication using an electric signal or an optical signal, and examples of a wired communication technology include wired communication technologies using a pair cable, a coaxial cable, and an optical fiber cable, and may further include wired communication technologies well-known to one of ordinary skill in the art.

The mobile communication module may, for example, transmit and receive a wireless signal to and from at least one of a base station, an external apparatus, and a server on a mobile communication network. Examples of the wireless signal include a voice call signal, an image call signal, or data in various forms based on transmission and reception of texts/multimedia messages.

The memory 230 may further include a storage unit 225, in addition to the plurality of buffers 220. The storage unit 225 may store data based on frame information obtained by the controller 210. The controller 210 may be configured to store object location information indicating an object area included in the frame information, in the storage unit 225. For example, the controller 210 may be configured to update object location information in the storage unit 225 whenever frame information of each frame is obtained. Also, the storage unit 225 may further store various types of information for operations of the image processing apparatus 200.

Figure 18:
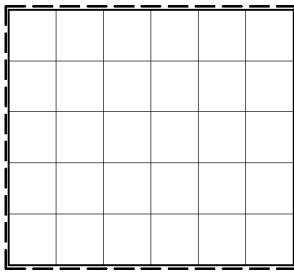
FIG. 18 is a table illustrating example object location information stored in a storage unit of FIG. 17.
Figure 18:
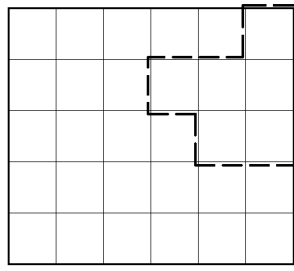
Figure 18:
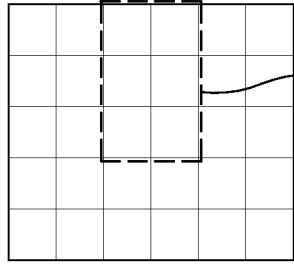

FIG. 18 is a table illustrating object location information TB1 that may be stored in the storage unit 225 of FIG. 17.

Referring to FIG. 18, the object location information TB1 may, for example, be data in a table form in which frame identifiers (FR-n, FR-n+1, and FR-n+2) for identifying frames and information indicating locations of object areas (OA1, OA1, and OA3) in the frames are mapped to each other.

The controller 210 of FIG. 17 may be configured to detect a duplicate area based on the object location information TB1 stored in the storage unit 225. The controller 210 may be configured to obtain the object areas (OA1, OA2, and OA3) based on the object location information TB1, and may be configured to detect a duplicate area by using the object areas (OA1, OA2, and OA3) as described above with reference to FIGS. 6, 10, and 14.

Hereinafter, a case in which frame information further includes alpha data for alpha blending, in addition to object information and object location information about an object added in a frame, will be described. Alpha blending refers, for example, to merging of an object of a current frame with a previous frame while drawing the object on the previous frame. A ratio of the object being merged in the previous frame is determined based on alpha data.

Figure 19:
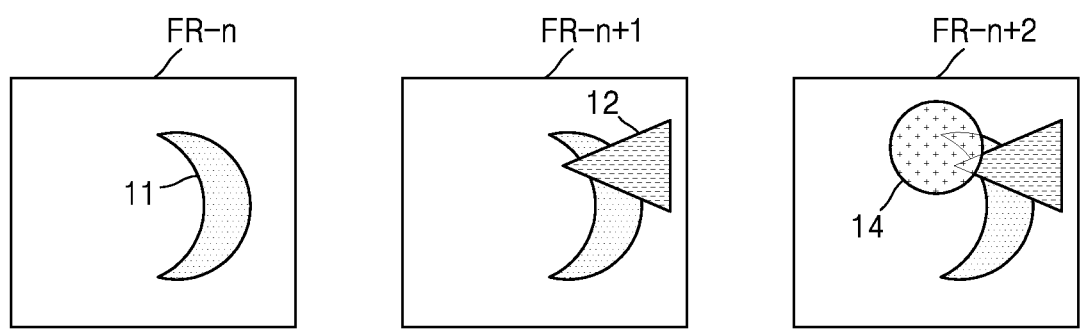
FIG. 19 is a diagram of frames illustrating alpha blending.

FIG. 19 is a diagram illustrating the n-th through n+2-th frames FR-n through FR-n+2 for describing alpha blending.

Referring to FIG. 19, the n-th frame FR-n and the n+1-th frame FR-n+1 from among the n-th through n+2-th frames FR-n through FR-n+2, which are three consecutive frames, are the same as those of FIG. 2. In the n+2-th frame FR-n+2, the object 14 having a circular shape is added to the n+1-th frame FR-n+1.

Frame information of the n+2-th frame FR-n+2 includes object location information and object information about the object 14 as shown in FIG. 13, and may further include alpha data. Since the object 14 of the n+2-th frame FR-n+2 is drawn through alpha blending, the first and second objects 11 and 12 of the previous frames may be shown at areas where the object 14 overlaps the first and second objects 11 and 12 in the n+2-th frame FR-n+2.

Whether frame information includes alpha data may vary according to frames. Frame information of the n+1-th frame FR-n+1 may not include alpha data because the first object 11 of the previous frame is not shown in an area where the second object 12 overlaps the first object 11 in the n+1-th frame FR-n+1.

Figure 20:
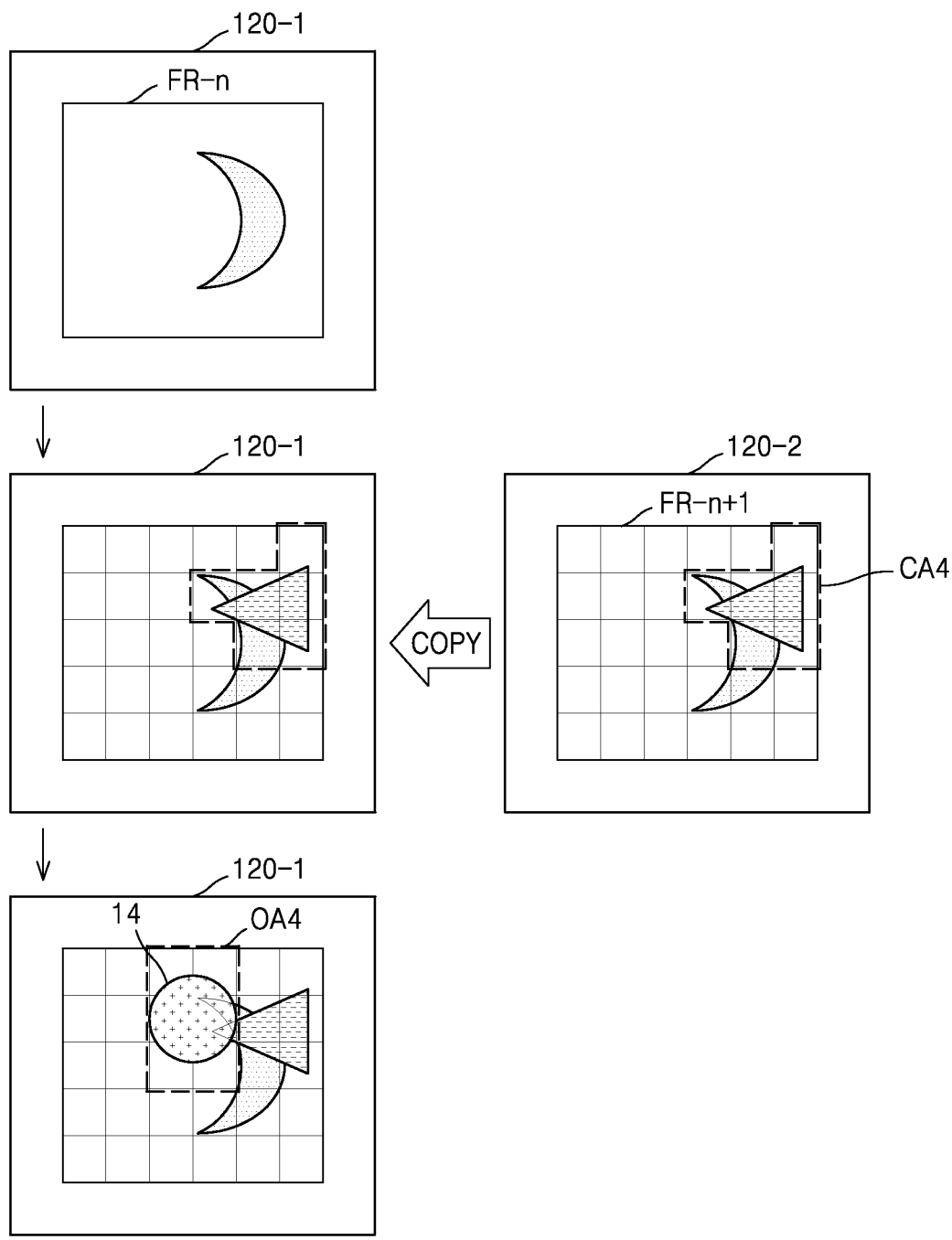
FIG. 20 is a diagram illustrating an example method of storing the n+2-th frame in the first buffer.

FIG. 20 is a diagram illustrating an example method of storing the n+2-th frame FR-n+2 in the first buffer 120-1.

Referring to FIGS. 1 and 20, the first and second buffers 120-1 and 120-2 are initially as shown in FIG. 8. For example, the n-th frame FR-n is stored in the first buffer 120-1 and the n+1-th frame FR-n+1 is stored in the second buffer 120-2.

Since the frame information of the n+2-th frame FR-n+2 further includes the alpha data in addition to the object location information and the object information about the object 14 as shown in FIG. 13, the controller 110 of FIG. 1 may be configured to detect a duplicate area in a manner different from that described with respect to FIG. 14. In FIG. 14, the controller 110 is configured to detect the duplicate area CA3 by comparing the second object area OA2, which is an object area of the n+1-th frame FR-n+1, with the object area OA4 of the n+2-th frame FR-n+2. However, when the frame information of the n+2-th frame FR-n+2 includes the alpha data, the controller 110 of FIG. 1 may be configured to directly detect the second object area OA2 that is the object area of the n+1-th frame FR-n+1 as a duplicate area CA4. For example, the controller 110 may be configured to detect the second object area OA2 as the duplicate area CA4 without having to compare the second object area OA2 with the object area OA4.

The controller 110 may be configured to copy the duplicate area CA4 stored in the second buffer 120-2 to the first buffer 120-1. Accordingly, the n+1-th frame FR-n+1 is stored in the first buffer 120-1, like the second buffer 120-2. Data stored in the first buffer 120-1 may be the same as data stored in the second buffer 120-2 by copying the duplicate area CA4 that is a part of the data stored in the second buffer 120-2.

The controller 110 may be configured to set the object area OA4 in the first buffer 120-1 based on the frame information (see FIG. 13) of the n+2-th frame FR-n+2, and draw the object 14 in the object area OA4. The controller 210 may be configured to draw the object 14 on the n+1-th frame FR-n+1 by merging the object 14 with the n+1-th frame FR-n+1 that is the previous frame, based on the alpha data.

Figure 21:
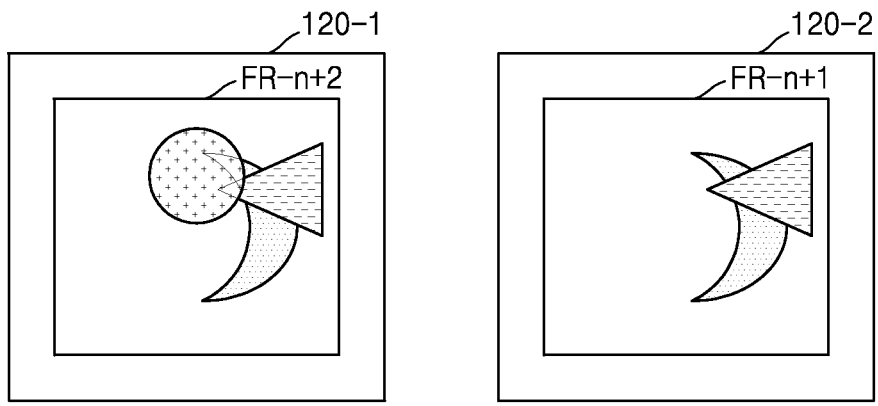
FIG. 21 illustrates the first buffer and the second buffer after operations of FIG. 20 are completed.

FIG. 21 illustrates the first buffer 120-1 and the second buffer 120-2 after operations of FIG. 20 are completed.

Referring to FIGS. 1 and 21, the n+2-th frame FR-n+2 is stored in the first buffer 120-1 and the n+1-th frame FR-n+1 is stored in the second frame 120-2.

Figure 22:
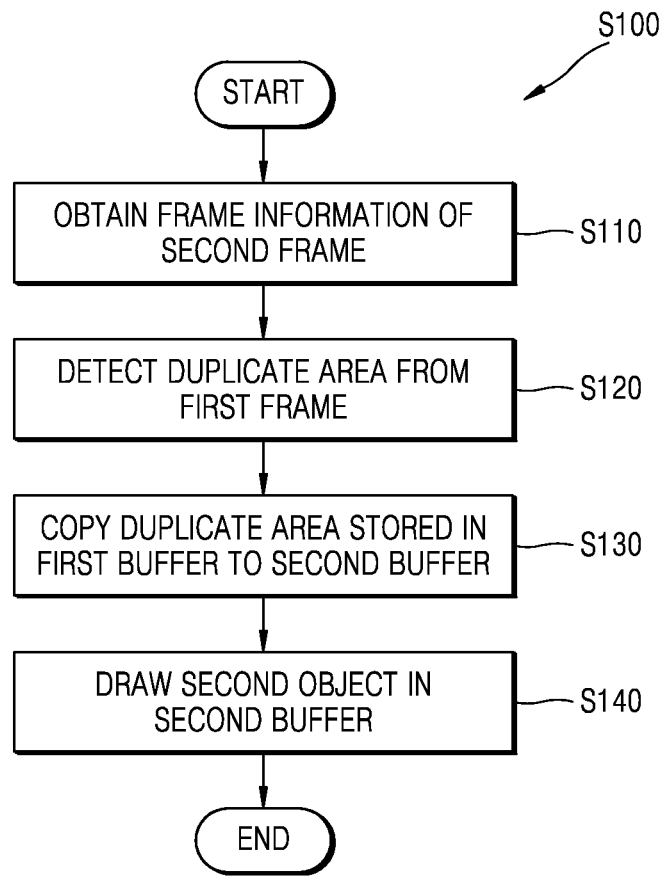
FIG. 22 is a flowchart illustrating an example method of operating an image processing apparatus.

FIG. 22 is a flowchart illustrating an example method S100 of operating an image processing apparatus.

Referring to FIG. 22, the image processing apparatus may obtain frame information of a second frame following a first frame S110. The frame information may include second object information about a second object added in the second frame, and second object location information indicating a second object area that is an area of the second object in the second frame.

The image processing apparatus may detect a duplicate area from the first frame S120. In operation S130, the image processing apparatus may copy the duplicate area stored in a first buffer to a second buffer. In operation S140, the image processing apparatus may draw the second object in the second buffer based on the frame information of the second frame.

Figure 23:
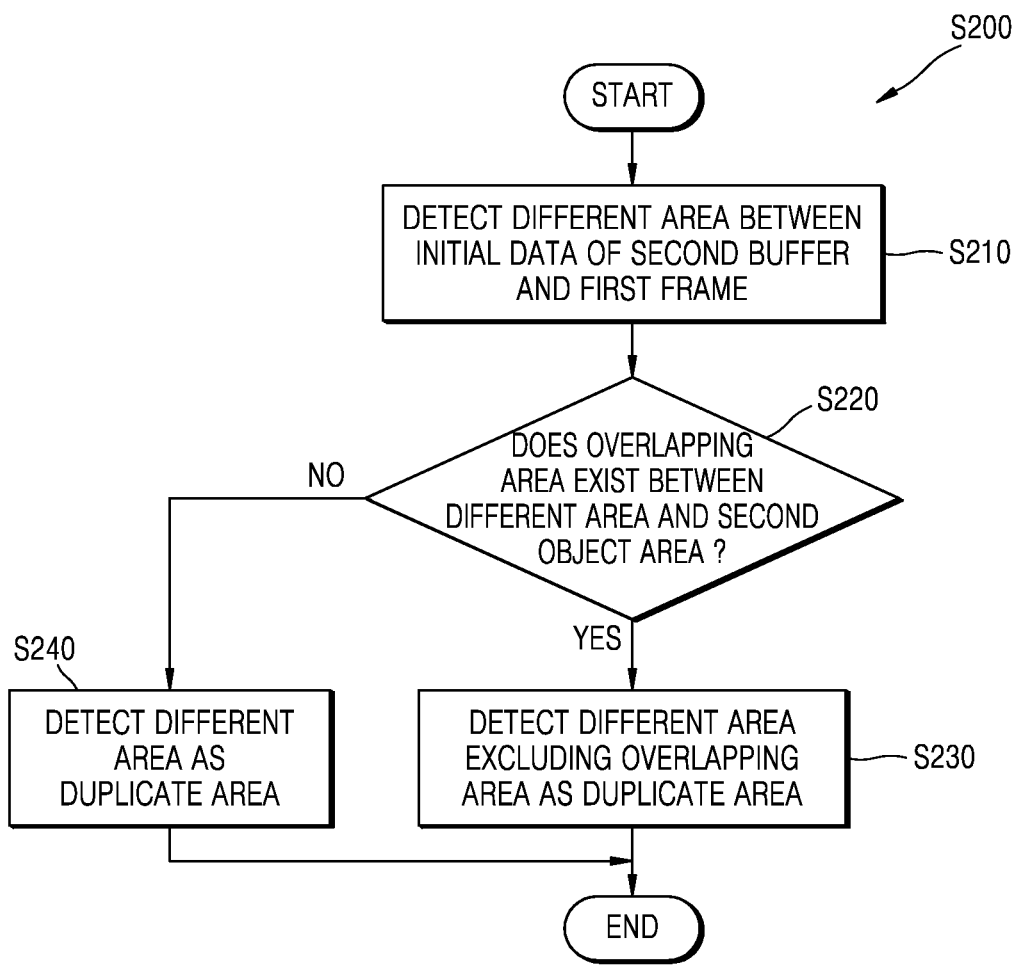
FIG. 23 is a flowchart illustrating an example method of detecting a duplicate area from a first frame by an image processing apparatus.

FIG. 23 is a flowchart illustrating an example method S200 of detecting a duplicate area from a first frame by an image processing apparatus.

Referring to FIG. 23, the image processing apparatus may detect the duplicate area from the first frame as follows so as to store a second frame in a second buffer, after obtaining frame information of the second frame. The image processing apparatus may detect a different area between initial data of the second buffer and the first frame, in operation S210. The image processing apparatus may compare the different area with a second object area to determine whether an overlapping area exists between the different area and the second object area, in operation S220. The image processing apparatus may obtain the second object area based on second object location information included in the frame information of the second frame.

When it is determined that the overlapping area exists, the image processing apparatus may detect the different area excluding the overlapping area, as the duplicate area, in operation S230. When it is determined that the overlapping area does not exist, the image processing apparatus may detect the different area as the duplicate area in operation S240. For example, the image processing apparatus may detect the different area excluding the second object area, as the duplicate area.

Figure 24:
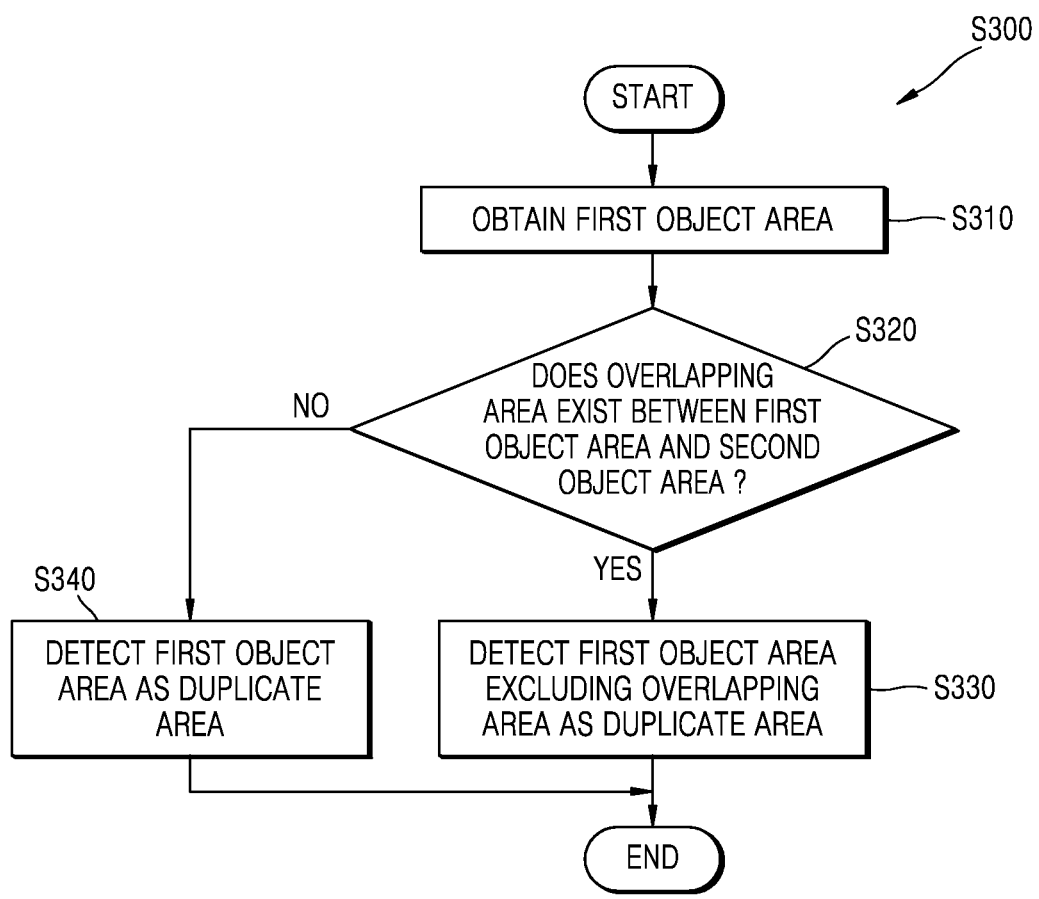
FIG. 24 is a flowchart illustrating an example method of detecting a duplicate area from a first frame by an image processing apparatus.

FIG. 24 is a flowchart illustrating an example method S300 of detecting a duplicate area from a first frame by an image processing apparatus.

Referring to FIG. 24, the image processing apparatus may obtain a first object area of the first frame in operation S310.

The image processing apparatus may obtain the first object area of the first frame based on object location information (see FIG. 18) stored in the storage unit 225 of FIG. 17. For example, when the image processing apparatus obtains frame information of the first frame, the image processing apparatus may store first object location information included in the frame information in the storage unit 225 of FIG. 17. The first object location information is information indicating the first object area that is an area of a first object added in the first frame.

The image processing apparatus may compare the first object area with a second object area to determine whether an overlapping area exists between the first and second object areas, in operation S320. The image processing apparatus may obtain the second object area based on second object location information included in frame information of a second frame.

When it is determined that the overlapping area exists, the image processing apparatus may detect the first object area excluding the overlapping area, as the duplicate area, in operation S330. When it is determined that the overlapping area does not exist, the image processing apparatus may detect the first object area as the duplicate area, in operation S340. For example, the image processing apparatus may detect the first object area excluding the second object area, as the duplicate area. The image processing apparatus may update the second object location information of the second frame in the storage unit 225 of FIG. 17.

The frame information of the second frame may further include alpha data for alpha blending. For example, the image processing apparatus may obtain the first object area of the first frame and detect the first object area as the duplicate area. The image processing apparatus may copy the duplicate area stored in a first buffer to a second buffer, and then draw a second object in the second buffer such that the second object is merged in the first frame based on the alpha data.

Figure 25:
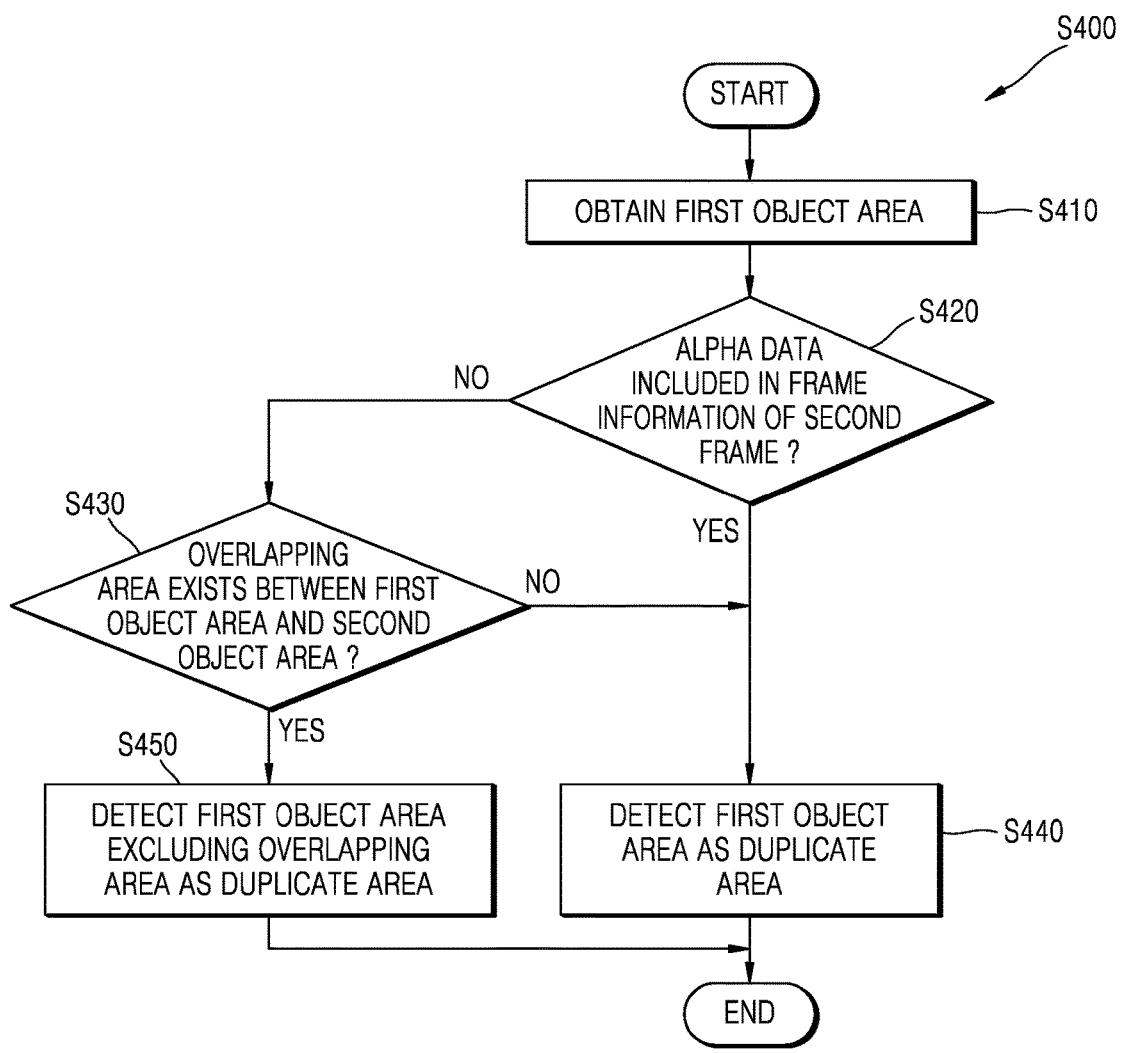
FIG. 25 is a flowchart illustrating an example method of detecting duplicate area from a first frame by an image processing apparatus.

FIG. 25 is a flowchart illustrating an example method S400 of detecting a duplicate area from a first frame by an image processing apparatus.

Referring to FIG. 25, the image processing apparatus may obtain a first object area of a first frame in operation S410. The image processing apparatus may determine whether frame information of a second frame includes alpha data, in operation S420. When it is determined that the frame information does not include the alpha data, the image processing apparatus may compare in operation S430 the first object area with a second object area to determine whether an overlapping area exists between the first and second object areas. When it is determined that the frame information includes the alpha data or the overlapping area does not exist between the first and second object areas, the image processing apparatus may detect the first object area as the duplicate area in operation S440. When it is determined that the frame information does not include the alpha data and the overlapping area exists, the image processing apparatus may detect the first object area excluding the overlapping area, as the duplicate area, in operation S450.

For example, when the frame information of the second frame includes the alpha data, the image processing apparatus may detect the first object area of the first frame as the duplicate area. When the frame information does not include the alpha data, the image processing apparatus may detect the first object area excluding the second object area, as the duplicate area.

Figure 26:
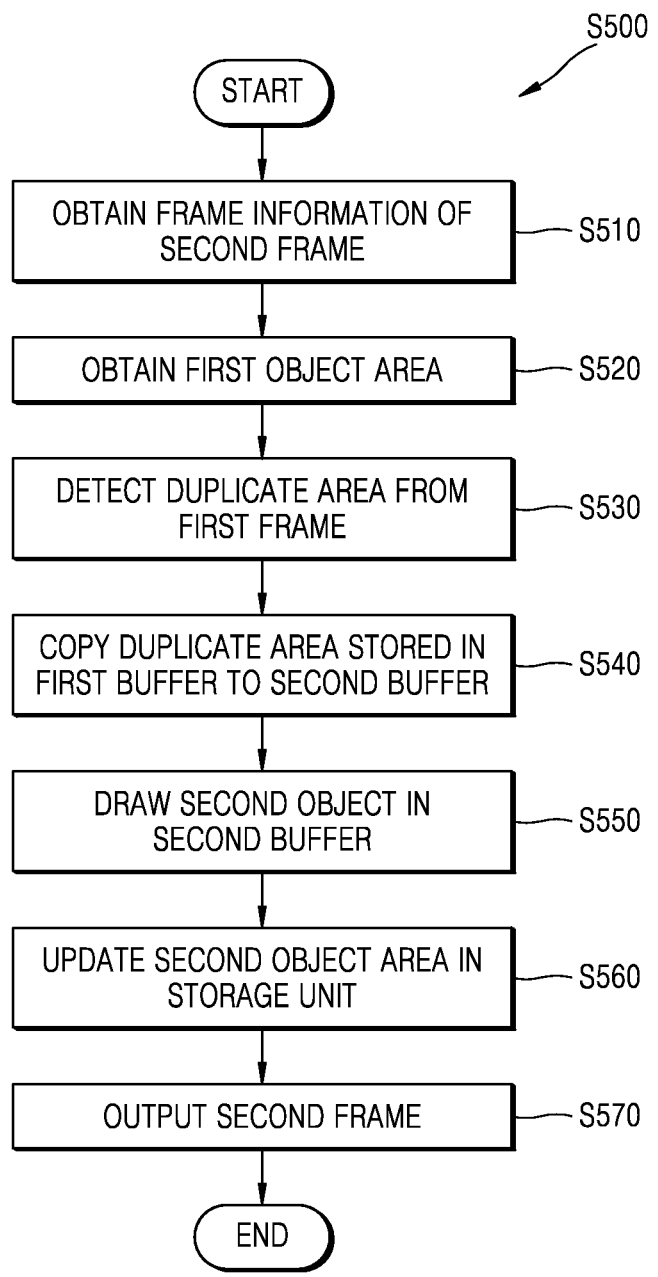
FIG. 26 is a flowchart illustrating an example method of operating an image processing apparatus.

FIG. 26 is a flowchart illustrating an example method S500 of operating an image processing apparatus.

Referring to FIG. 26, the image processing apparatus may obtain frame information of a second frame following a first frame, in operation S510, the frame information may include second object information about a second object added in the second frame, and second object location information indicating a second object area in the second frame.

The image processing apparatus may obtain a first object area of the first frame in operation S520. The image processing apparatus may obtain the first object area of the first frame based on object location information (see FIG. 18) stored in the storage unit 225 of FIG. 17.

The image processing apparatus may detect a duplicate area from the first frame, in operation S530. A method of detecting the duplicate area from the first frame has been described above.

The image processing apparatus may copy the duplicate area stored in a first buffer to a second buffer, in operation S540. The image processing apparatus may draw the second object in the second buffer based on the frame information of the second frame, in operation S550. The image processing apparatus may update the second object location information of the second frame in the storage unit, in operation S560.

The image processing apparatus may output the second frame, in operation S570. When the image processing apparatus that was outputting the first frame draws the second object in the second buffer, the image processing apparatus is able to output the second frame following the first frame.

The methods S100 through S500 described above with reference to FIGS. 22 through 26 may, for example, be performed by the image processing apparatus 100 of FIG. 1 or 200 of FIG. 17 described above. Each operation of the methods S100 through S500 may be performed in the manner described above.

Figure 27:
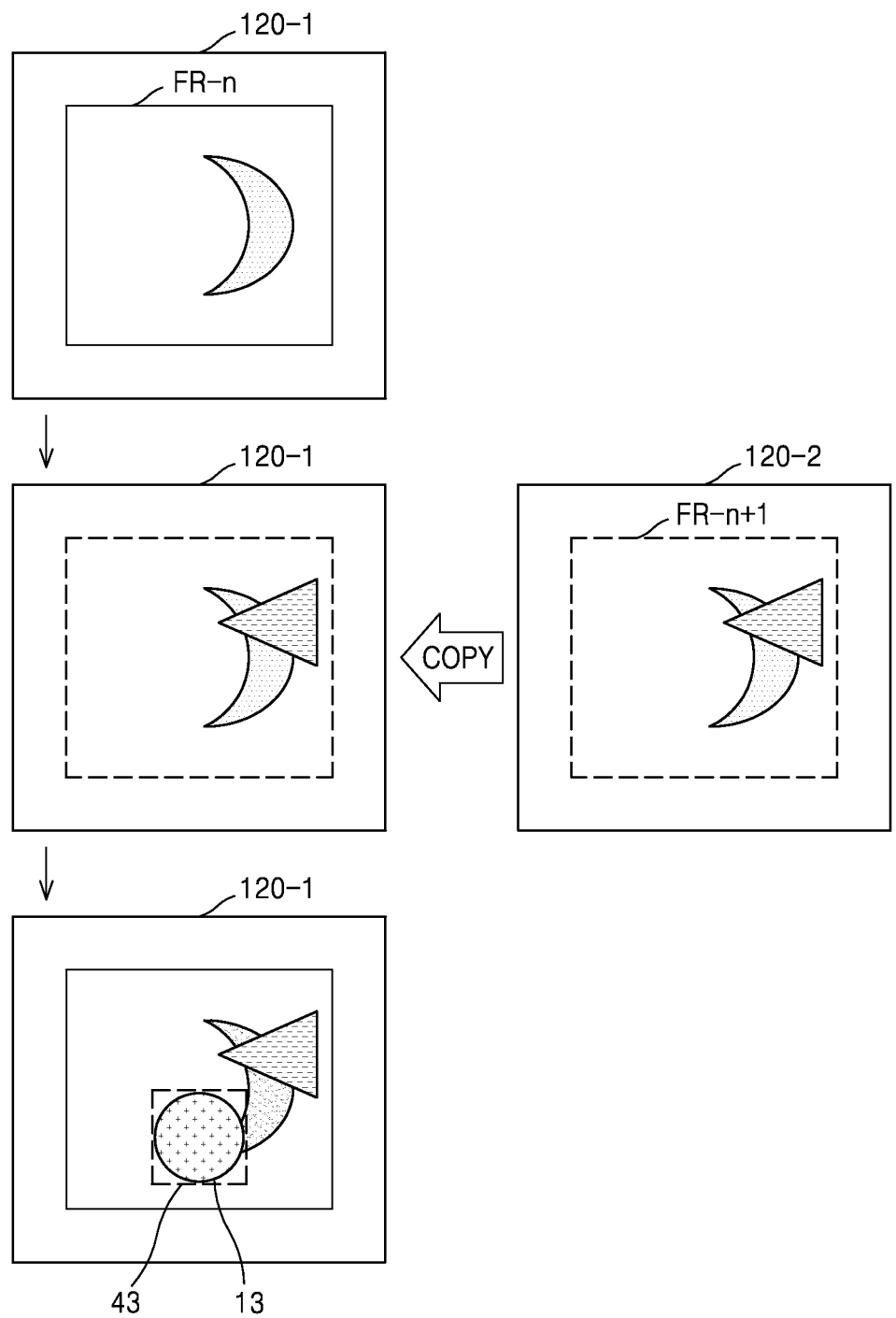
FIG. 27 is a diagram illustrating an example of a method of operating an image processing apparatus.

FIG. 27 is a diagram illustrating an example of a method of operating an image processing apparatus differently from the examples of the disclosure described above.

Referring to FIG. 27, the n-th frame FR-n is stored in the first buffer 120-1 and the n+1-th frame FR-n+1 is stored in the second buffer 120-2, initially. The n+2-th frame FR-n+2 may be stored in the first buffer 120-1 as described below.

The n+1-th frame FR-n+1 stored in the second buffer 120-2 is entirely copied to the first buffer 120-1. Then, based on frame information of the n+2-th frame FR-n+2, an object area 43 is set in the first buffer 120-1, and the third object 13 of the n+2-th frame FR-n+2 is drawn in the object area 43. Accordingly, the n+2-th frame FR-n+2 is stored in the first buffer 120-1.

When the n+1-th frame FR-n+1 that is a previous frame stored in the second buffer 120-2 is entirely copied to the first buffer 120-1, the n+1-th frame FR-n+1 that is the previous frame is stored on the first buffer 120-1. However, areas that are not required to be copied, such as an area that is the same before and after copying in the first buffer 120-1, and the object area 43 to which the third object 13 of the n+2-th frame FR-n+2 is added, are copied. Thus, the entire copying between buffers may largely increase an overhead of image processing when a frame has high resolution. Accordingly, efficiency of the image processing apparatus may be decreased.

Comparing FIG. 27 with FIG. 11 according to an example, in FIG. 11, only the duplicate area CA2 is copied from the second buffer 120-2 to the first buffer 120-1. For example, according to an example, an overhead of image processing may be decreased, thereby increasing efficiency of an image processing apparatus.

Figure 28:
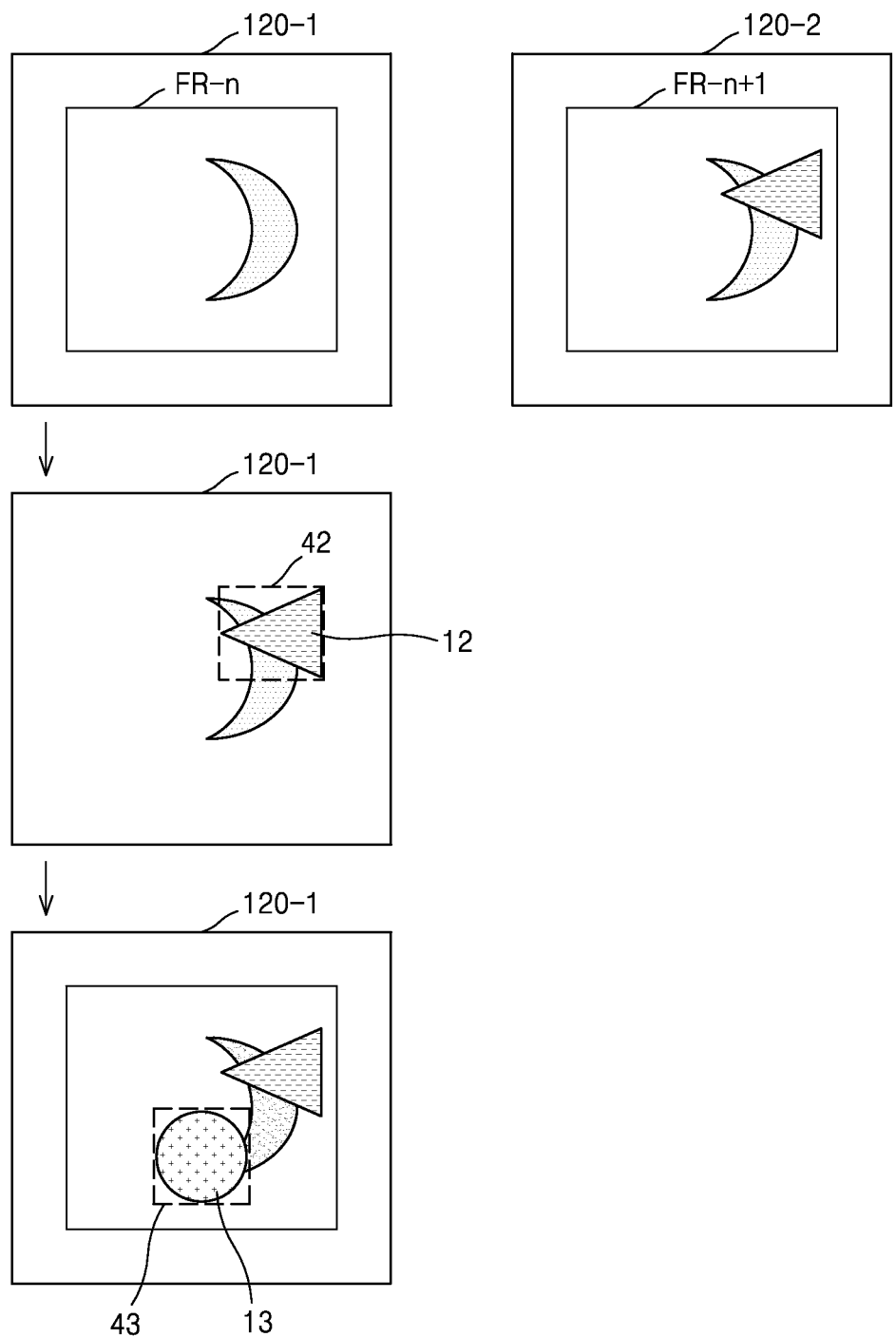
FIG. 28 is a diagram illustrating another example of a method of operating an image processing apparatus.

FIG. 28 is a diagram illustrating another example of a method of operating an image processing apparatus differently from the examples of the disclosure described above.

Referring to FIG. 28, the n-th frame FR-n is stored in the first buffer 120-1 and the n+1-th frame FR-n+1 is stored in the second buffer 120-2 initially. The n+2-th frame FR-n+2 may be stored in the first buffer 120-1 as follows.

A different area 42 is set by comparing the n-th frame FR-n, which is initial data stored in the first buffer 120-1, with the n+1-th frame FR-n+1 stored in the second buffer 120-2. The second object 12 that is not in the n-th frame FR-n is drawn in the different area 42 of the first buffer 120-1. Then, based on frame information of the n+2-th frame FR-n+2, the object area 43 is set in the first buffer 120-1, and the third object 13 of the n+2-th frame FR-n+2 is drawn in the object area 43. As such, the n+2-th frame FR-n+2 is stored in the first buffer 120-1.

In FIG. 28, data stored in the second buffer 120-2 is not copied, unlike FIG. 27. Rather, the second object 12 of the n+1-th frame FR-n+1 that was already drawn in the second buffer 120-2 is drawn again in the first buffer 120-1. An overhead of a process of re-drawing the second object 12 may be increased when the second object 12 is more complicated. When an additional image processing operation, such as 2-pass rendering, alpha blending, or applying a certain filter to the second object 12 after drawing the second object 12, is required while drawing the second object 12, complexity of drawing the second object 12 again may increase. Accordingly, an overhead of the image processing apparatus may be increased compared to the case when copying is performed.

Comparing FIG. 28 with FIG. 11 according to an example, in FIG. 11, the second object 12 is not drawn again in the first buffer 120-1, but the duplicate area CA2 is copied from the second buffer 120-2 to the first buffer 120-1. Accordingly, an overhead of image processing may be lower than when the second object 12 is drawn again.

Also, in order to draw the second object 12 that was already drawn in the second buffer 120-1 again in the first buffer 120-1, the frame information of the n+1-th frame FR-n+1 may be continuously stored. Object information required to draw the second object 12 again is managed to be continuously stored in a memory. According to an example, as shown in FIG. 18, only object location information indicating an area of the second object 12 may be stored from among the frame information of the n+1-th frame FR-n+1. On the other hand, in FIG. 28, since object information needs to be continuously stored in order to draw the second object 12 again, memory capacity may lack.

According to an example, when a second frame that is a new frame starts, a duplicate area that is a part of a first frame that is a previous frame is detected from a first buffer in which the first frame is stored, and only the duplicate area is copied to a second buffer to which the new frame is assigned. Accordingly, an overhead of copying may be reduced, and an overhead of drawing an object of the first frame, which was already drawn, again in a second buffer may not exist. Then, by drawing an object of the second frame in the second buffer based on frame information of the second frame, the second frame is stored in the second buffer. As such, since an image processing operation of storing the second frame in the second buffer is not complicated, an overhead of the image processing apparatus may be reduced.

Accordingly, a processing speed of the image processing apparatus may be increased and efficiency may be increased. Thus, an overall system performance of the image processing apparatus may improve.

The examples can be written as computer programs and can be implemented in digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While one or more examples have been described with reference to the figures, it will be understood by those of ordinary skill in the art that various changes in form and details may be made therein without departing from the spirit and scope of the disclosure as defined by the following claims.

What is claimed is:

1. An image processing apparatus comprising:
    a plurality of buffers, a first buffer from among the plurality of buffers for storing a first frame; and
    a controller configured to:
        obtain frame information of a second frame, comprising second object information about a second object added in the second frame and second object location information indicating a second object area of the second object in the second frame,
        detect a duplicate area in the first frame, the duplicate area being a first object area excluding an overlapping area between the first object area of the first frame and the second object area of the second frame,
        copy the duplicate area stored in the first buffer to a second buffer from among the plurality of buffers, and
        draw the second object in the second buffer based on the frame information of the second frame,
        obtain frame information of a third frame, comprising third object information about a third object added in the third frame and third object location information indicating a third object area of the third object in the third frame,
        detect a further duplicate area in the second frame, the further duplicate area being the second object area excluding an overlapping area between the second object area and the third object area,
        copy the further duplicate area stored in the second buffer to the first frame stored in the first buffer, and
        draw the third object in the first buffer, based on the frame information of the third frame.

2. The image processing apparatus of claim 1, further comprising a storage configured to store first object location information indicating the first object area of the first frame,
    wherein the controller is further configured to obtain the first object area based on the first object location information stored in the storage and update the second object location information of the second frame in the storage.

3. The image processing apparatus of claim 1, wherein the frame information of the second frame further comprises alpha data for alpha blending.

4. The image processing apparatus of claim 3, wherein the controller is further configured to draw, in the second buffer, the second object being merged in the first frame based on the alpha data.

5. The image processing apparatus of claim 1, wherein, the controller is further configured to detect a first object area of the first frame as the duplicate area when the frame information of the second frame comprises alpha data, and the controller is further configured to detect the first object area excluding the second object area as the duplicate area when the frame information of the second frame does not comprise alpha data.

6. The image processing apparatus of claim 1, further comprising a display configured to output the first frame, and to output the second frame immediately following the first frame when the controller draws the second object in the second buffer.

7. The image processing apparatus of claim 6, further comprising an input unit configured to receive a manipulation command,
    wherein the controller is further configured to obtain the frame information of the second frame based on the manipulation command.

8. The image processing apparatus of claim 1, wherein the controller is further configured to detect a different area between initial data stored in the second buffer and the first frame and to detect the different area or a part of the different area as the duplicate area.

9. A method of operating an image processing apparatus, comprising:
    obtaining frame information of a second frame comprising second object information about a second object added in a second frame immediately following a first frame and second object location information indicating a second object area of the second object in the second frame;
    detecting a duplicate area in the first frame, the duplicate area being a first object area excluding an overlapping area between the first object area of the first frame and the second object area of the second frame,
    copying the duplicate area stored in a first buffer to a second buffer,
    drawing the second object in the second buffer based on the frame information of the second frame, and
    obtaining frame information of a third frame, comprising third object information about a third object added in the third frame and third object location information indicating a third object area of the third object in the third frame,
    detecting a further duplicate area in the second frame, the further duplicate area being the second object area excluding an overlapping area between the second object area and the third object area,
    copying the further duplicate area stored in the second buffer to the first frame stored in the first buffer, and
    drawing the third object in the first buffer, based on the frame information of the third frame.

10. The method of claim 9, wherein the first object area is obtained based on first object area information indicating the first object area, the first object area information being stored in a storage unit, and
    the operating method further comprises updating the second object location information of the second frame in the storage unit.

11. The method of claim 9, wherein the frame information of the second frame further comprises alpha data for alpha blending.

12. The method of claim 11, wherein drawing the second object comprises drawing the second object in the second buffer such that the second object is merged in the first frame based on the alpha data.

13. The method of claim 9, wherein, when the frame information of the second frame comprises alpha data, a first object area of the first frame is detected as the duplicate area, and when the frame information of the second frame does not comprise alpha data, the first object area excluding the second object area is detected as the duplicate area.

14. The method of claim 9, further comprising:
    outputting the first frame; and
    outputting the second frame immediately following the first frame, when the second object is drawn in the second buffer.

15. The method of claim 14, further comprising receiving a manipulation command,
    wherein the frame information of the second frame is obtained based on the manipulation command.

16. A non-transitory computer-readable recording medium having recorded thereon a program, which when executed by a computer, performs the method of claim 9.

* * * * *